United States Patent [19]
Hattori et al.

[11] Patent Number: 6,048,289
[45] Date of Patent: Apr. 11, 2000

[54] HYBRID VEHICLE

[75] Inventors: Noboru Hattori; Shunichi Aoyama, both of Kanagawa; Shinichiro Kitada; Isaya Matsuo, both of Tokyo, all of Japan

[73] Assignee: Nissan Motor Co., Ltd., Yokohama, Japan

[21] Appl. No.: 09/263,837

[22] Filed: Mar. 8, 1999

[30] Foreign Application Priority Data

Mar. 30, 1998 [JP] Japan .................................. 10-084149

[51] Int. Cl.⁷ ........................... B60K 41/02; B60K 41/12
[52] U.S. Cl. .................................... 477/15; 477/3; 477/5; 180/65.2; 180/65.4; 180/65.7
[58] Field of Search .................. 477/2, 3, 5, 8, 477/15; 180/65.2, 65.4, 65.7

[56] References Cited

U.S. PATENT DOCUMENTS

| | | | |
|---|---|---|---|
| 4,547,678 | 10/1985 | Metzner et al. | 290/40 |
| 5,083,473 | 1/1992 | Nakano . | |
| 5,249,637 | 10/1993 | Heidl et al. | 180/65.2 |
| 5,327,987 | 7/1994 | Abdelmalek | 180/65.2 |
| 5,327,991 | 7/1994 | Yoshida | 180/65.4 |
| 5,359,288 | 10/1994 | Yoshida | 290/17 |
| 5,441,122 | 8/1995 | Yoshida | 180/65.2 |
| 5,492,190 | 2/1996 | Yoshida | 180/65.4 |
| 5,758,758 | 6/1998 | Friedrich | 192/91 R |
| 5,785,138 | 7/1998 | Yoshida | 180/65.2 |

OTHER PUBLICATIONS

Automotive Engineering, vol. 46, No. 7, Jun. 1, 1997, pp. 39–52.

*Primary Examiner*—Sherry L. Estremsky
*Attorney, Agent, or Firm*—Foley & Lardner

[57] ABSTRACT

In a hybrid vehicle, an internal combustion engine and a first electric propulsion motor are linked to an input axle of a clutch and an input axle of a continuously variable transmission and a second electric propulsion motor are linked to an output axle of the clutch. A propulsion mechanism for transmitting a power from an output axle of the continuously variable transmission to drive axles, a third electric propulsion motor used to drive a hydraulic system of the continuously variable transmission, a battery supply, a power inverter for charging and discharging between the battery supply and the first, second, and third electric propulsion motors, and a controller for controlling operations of the power inverter, the battery supply, the first, second, and third motors, and the continuously variable transmission are provided in the hybrid vehicle.

20 Claims, 14 Drawing Sheets

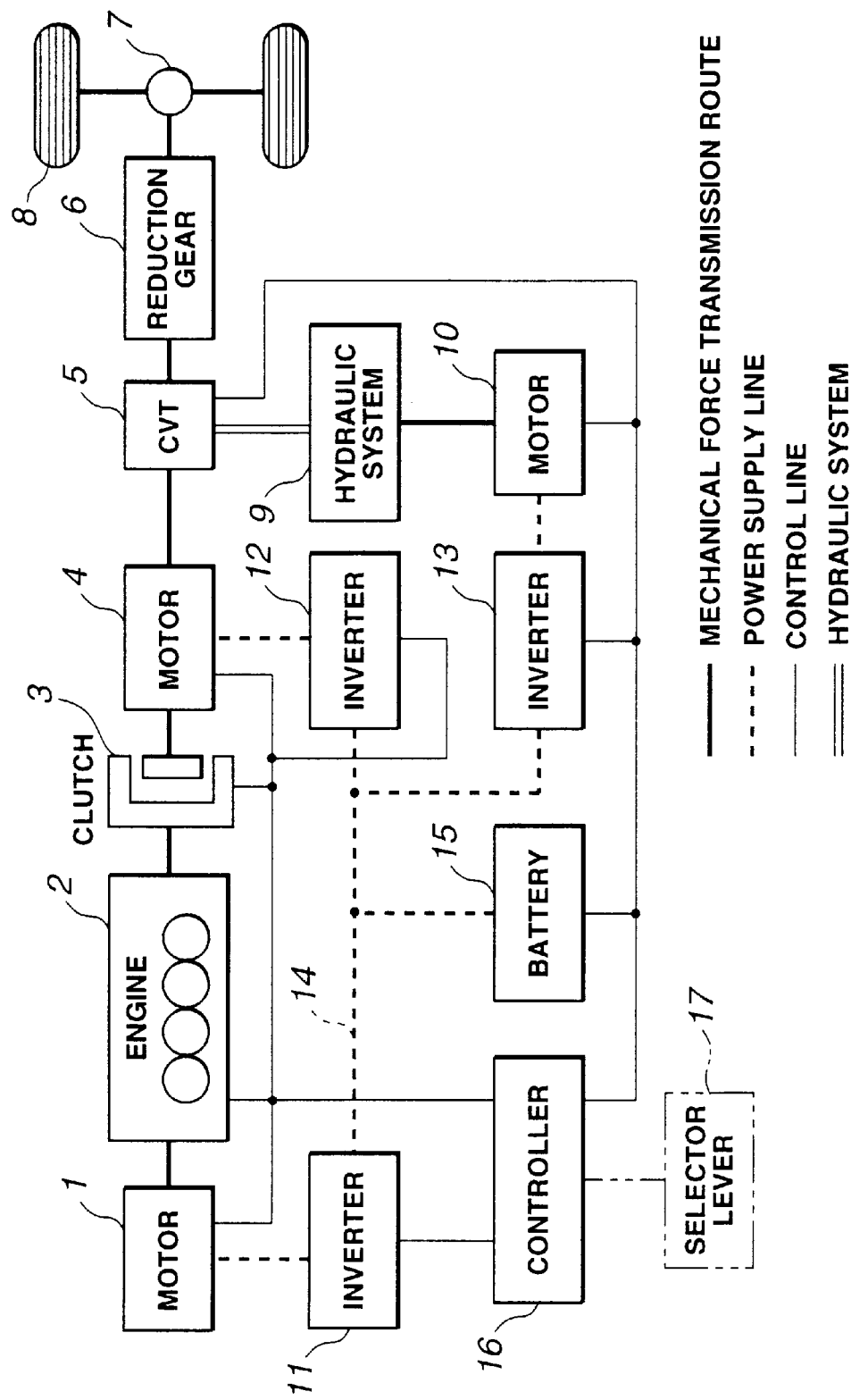

HYBRID VEHICLE

BACKGROUND OF THE INVENTION a) Field of the Invention

The present invention relates to a hybrid vehicle, the hybrid vehicle having a drive source constituted by either or both of an internal combustion engine and/or an electric propulsion motor.

b) Description of the Related Art

In a hybrid vehicle, a power generator is linked to a sun gear of a planetary gear mechanism, an internal combustion engine is linked to a planetary carrier, an electric motor is linked to a ring gear, and part of a driving force generated by the engine is transmitted directly from the planetary gear mechanism to drive wheels. Another part of the driving force of the engine is transmitted uninterruptedly from the planetary gear mechanism to the power generator to generate an electric power, the generated power causing the motor to be driven to transmit the driving force generated by the motor to the drive wheels (refer to pages 39 to 52 of a Japanese Monthly magazine titled "Automotive Engineering", volume 46 No. 7, published on Jun. 1, 1997.

SUMMARY OF THE INVENTION

However, in the hybrid vehicle described in the BACKGROUND OF THE INVENTION, no clutch is interposed between the internal combustion engine and the electric motor. Hence, in order to avoid an engine revolution together with a motor revolution in an interlocking operation when the hybrid vehicle is started by means of a driving force developed by the motor or when the vehicle is decelerated by means of a regenerative brake of the motor, it is often necessary to reverse the power generator, and, hence, an energy loss occurs depending upon a vehicular running mode.

It is therefore an object of the present invention to provide a hybrid vehicle which can achieve an effective utilization of the energy in every vehicular running mode and can achieve an improvement in a fuel consumption rate.

The above-described object can be achieved by providing a vehicle. The vehicle comprises: a clutch having an input axle thereof and an output axle thereof; an internal combustion engine for driving the input axle of the clutch; a first electric propulsion motor for driving the input axle of the clutch; a second electric propulsion motor for driving the output axle of the clutch; a continuously variable transmission having an input axle connected to the output axle of the clutch via the second electric propulsion motor and an output axle connected to the drive wheels of the vehicle; a third electric propulsion motor for driving a hydraulic system of the continuously variable transmission; a battery supply; a power inverter for charging and discharging between the battery supply and the first, second, and third electric propulsion motors; and a controller for controlling operations of the engine, the power inverter, the first, second, and third electric propulsion motors, and the continuously variable transmission.

The above-described object can also be achieved by providing a method applicable to a vehicle. The method comprises: providing a clutch having an input axle thereof and an output axle thereof; providing an internal combustion engine for driving the input axle of the clutch; providing a first electric propulsion motor for driving the input axle of the clutch; providing a second electric propulsion motor for driving the output axle of the clutch; providing a continuously variable transmission having an input axle connected to the output axle of the clutch via the second electric propulsion motor and an output axle connected to drive wheels of the vehicle; providing a third electric propulsion motor for driving a hydraulic system of the continuously variable transmission; providing a battery supply; providing a power inverter for charging and discharging between the battery supply and the first, second, and third electric propulsion motors; and controlling operations of the engine, the power inverter, the first, second, and third electric propulsion motors, and the continuously variable transmission.

BRIEF DESCRIPTION OF THE DRAWINGS

FIG. 1 is a schematic block diagram of a hybrid vehicle in a preferred embodiment according to the present invention.

DETAILED DESCRIPTION OF THE PREFERRED EMBODIMENT

Figure 2A:
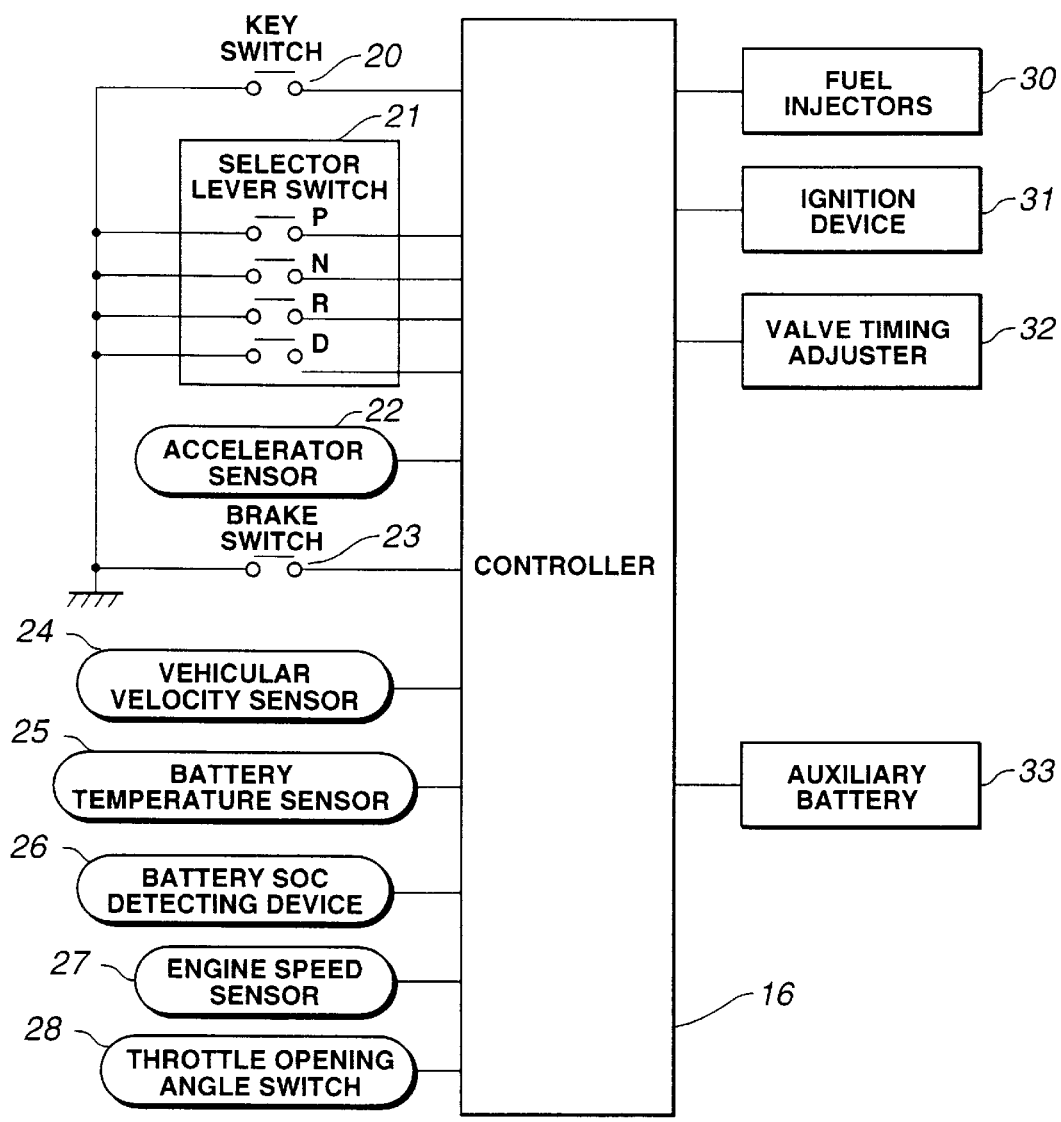
FIG. 2A is a circuit block diagram of a controller and its peripheral circuit of the hybrid vehicle shown in FIG. 1.

Reference will hereinafter be made to the drawings in order to facilitate a better understanding of the present invention.

FIG. 1 shows a preferred embodiment of a hybrid vehicle according to the present invention.

In FIG. 1, a bold solid line denotes a transmission path of a mechanical force, a bold broken line denotes a power line, a thin solid line denotes a control signal line, and a double line denotes a hydraulic system.

A power train in the hybrid vehicle is constituted by a first electric propulsion motor 1, an internal combustion engine 2, a clutch 3, a second motor 4, a speed reduction gear 6, a differential gear 7, and drive wheels 8. An output axle of the first motor 1, an output axle of the engine 2, and an input axle of the clutch 3 are mutually linked together. In addition, an output axle of the clutch 3, an output axle of the motor 4, and an input axle of a continuously variable transmission 5 are mutually linked.

When the clutch 3 is engaged, both of the engine 2 and the second motor 4 serve as a propulsion source of the hybrid vehicle. When the clutch 3 is released, only the second motor 4 serves as the propulsion source of the hybrid vehicle. A drive force generated by the engine 2 and/or the second motor 4 is transmitted to respective drive wheels 8 via the continuously variable transmission 5, the speed reduction gear 6, and the differential gear 7.

A pressurized working oil is supplied from the hydraulic system 9 to the continuously variable transmission 5 so as to perform a clamp of a belt portion (in the case of the troidal type, a troidal core portion) and a lubrication thereof. An oil pump (not shown) of the hydraulic system 9 is driven by means of a third electric propulsion motor 10. Hence, the third electric propulsion motor 10 is also called an oil pump motor.

Each of the first, second, and third electric propulsion motors 1, 4, and 10 is constituted by an AC machine such as a three-phase synchronous motor or a three-phase induction motor. The first motor 1 is mainly used to start the engine 2 and to generate the electric power as a power generator.

The second motor 4 is mainly used to propel the hybrid vehicle and to brake the vehicle.

The third motor 10 is used to drive the oil pump for the hydraulic system 9. It is noted that a DC motor may constitute each or any one or more of the first, second, and third electric propulsion motors 1, 4, and 10. When the clutch 3 is engaged, the first motor 1 may be used to propel the vehicle and to perform the braking of the vehicle. The second motor 4 may be used to start the engine and to generate the electric power.

The clutch 3 is a powder type clutch and is capable of regulating a transmission torque thereat. The clutch 3 is exemplified by a U.S. Pat. No. 5,758,758 issued on Jan. 2, 1998, the disclosure of which is herein incorporated by reference.

It is noted that a dry single plate type clutch or a wet multi-plate type clutch may be used for the clutch 3.

The continuously variable transmission 5 is a belt type or toroidal type continuously variable transmission, the gear (speed) ratio thereof being capable of being adjusted at an unlimited stage.

A first inverter 11 serves to drive the first electric propulsion motor 1, a second inverter 12 serves to drive the second electric propulsion motor 4, and a third inverter 13 serves to drive the third electric propulsion motor 10.

It is noted that in a case where the DC motor is used for each of the first, second, and third motors 1, 4, and 10, a DC/DC converter may be used in place of each inverter.

Since the inverters 11 through 13 are connected to a main battery 15 via a common DC link 14 and a DC charged power of the main battery 15 is inverted into a DC power to be supplied to the first, second, and third motors 1, 4, and 10 and an AC generated power of the first and second motors 1 and 4 is inverted into the DC power to charge the main battery 15.

Since the inverters 11 through 13 are interconnected via the DC link 14, the electric power generated by means of any one of the first, second, and third electric propulsion motors 1, 4, and 10 during a regenerative operation can directly be supplied to any other of the motors during a power running without pass into the main battery 15. The main battery 15 may be constituted by one of various types of cells such as a lithium ion cell, a Nickel Hydrogen cell, a lead storage battery (cell), or by an electric double layer capacitor, namely, so-called, a power capacitor.

The controller 16 includes a microcomputer, its peripheral parts, and various types of actuators and serves to control operations such as a revolution speed and an output torque of the engine 2, the transmission torque of the clutch 2, a revolution speed and an output torque of the first, second, and third electric propulsion motors 1, 4, and 10, and a gear (speed) ratio of the continuously variable transmission 5.

Figure 2B:
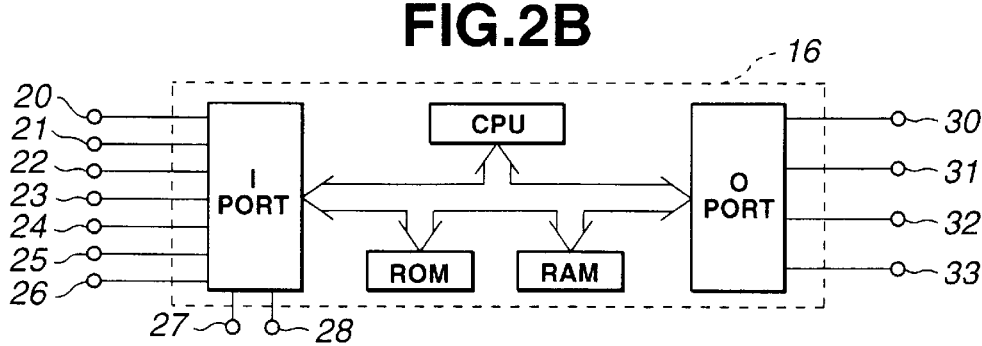
FIG. 2B is a circuit block diagram of an internal circuit of the controller shown in FIG. 2A.

FIGS. 2A and 2B show a circuit configuration of the controller 16, its peripheral circuit, and various types of actuators and sensors. FIG. 2B particularly shows an internal configuration of the controller 16.

As shown in FIG. 2A, a key switch 20, a selector lever switch 21, an accelerator sensor 22, a brake switch 23, a vehicular velocity sensor 24, a battery temperature sensor 25, a battery SOC (Status of Charge) detecting device 26, an engine speed sensor 27, and a throttle opening angle sensor 28 are connected to the controller 16.

The key switch 20 is closed when a vehicle key is set into an ON position or START position (hereinafter, a closure of any switch is called an ON position and an open of any switch is called an OFF position). The selector lever switch 21 has switches, each switch corresponding to any one of positions of P, N, R, or D range according to a set position by a selector lever (17 shown in FIG. 1) which selectively switches one of a parking P, a neutral N, a reverse R, and a drive D. It is noted that the selector lever switch 21 shown in FIG. 2A is included in the selector lever 17 shown in FIG. 1.

The accelerator sensor 22 detects a depression depth (accelerator opening angle) $\theta$ of an accelerator pedal. The brake switch detects a depression or released state of a brake pedal (at this time, the depression state is indicated by a switch ON). The vehicular velocity sensor 24 detects a vehicular velocity V. The battery temperature sensor 25 detects a temperature Tb of the main battery 15. In addition, the battery SOC detecting device 26 detects a charged condition of the main battery 15 (hereinafter, also referred to as SOC (State of Charge)). Furthermore, the engine speed sensor 27 detects the revolution speed Ne of the engine 2 and the throttle opening angle sensor 28 detects the opening angle $\theta$th of the throttle valve of the engine 2. In addition, the battery SOC detecting device 26 detects the charged state of the main battery 15 (hereinafter, referred to as SOC).

The engine speed sensor 27 detects the revolution speed Ne of the engine 2. The throttle valve opening angle sensor 28 detects the opening angle $\theta$th of the throttle valve of the engine 2.

A fuel injection device (fuel injectors) 30 of the engine 2, an ignition device 31 thereof, and a valve timing adjusting device 32 thereof are connected to the controller 16.

The controller 16 controls operations of the fuel injection device 30 to regulate supply-and-halt timings of the fuel to the engine 2 and operations of the ignition device 31 to regulate an ignition timing of the engine 2.

In addition, the controller 16 regulates an operation of the valve timing adjusting device 32 to adjust a closure timing of an intake valve of the engine 2. It is noted that the power of the controller 16 and its peripheral circuits is supplied from a low voltage auxiliary battery 33.

Figure 3:
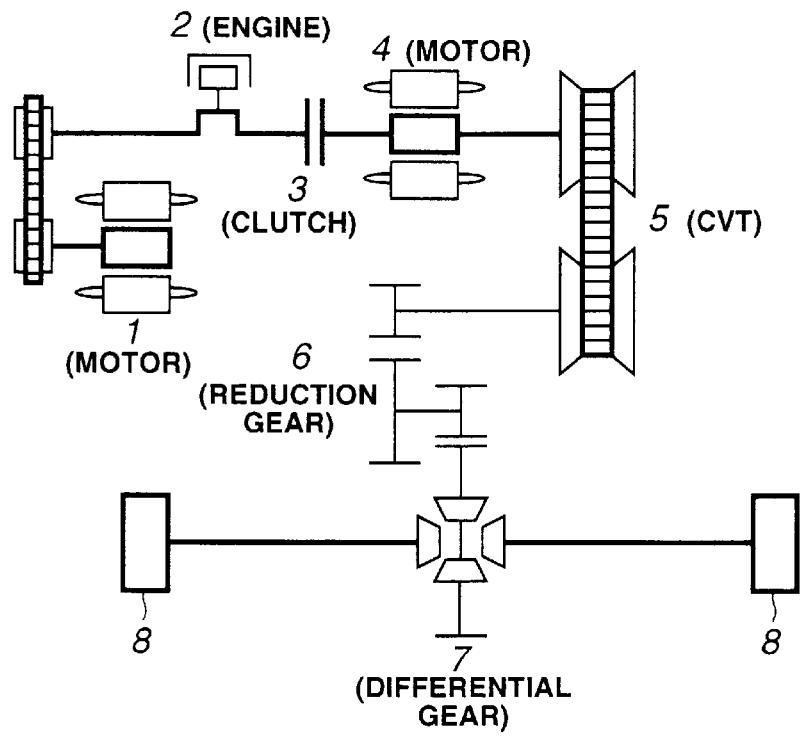
FIG. 3 is an exemplified explanatory view of an arrangement of a power train in the hybrid vehicle in the preferred embodiment shown in FIG. 1.
Figure 4:
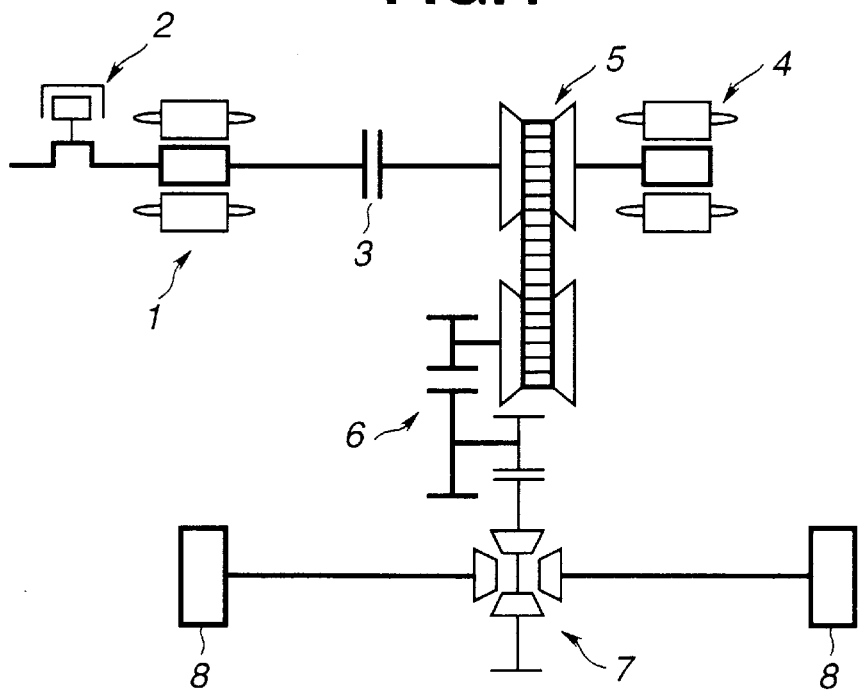
FIG. 4 is another exemplified explanatory view of another arrangement of the power train in the hybrid vehicle in the preferred embodiment shown in FIG. 1.

FIGS. 3 and 4 show respective examples of an arrangement of the power train in the hybrid vehicle.

The arrangement of the first electric propulsion motor 1 and the engine 2 which are located on the input axle of the clutch 3 may be such that the first electric propulsion motor 1 is located at an upstream side of the engine 2 as shown in FIG. 3 or such that the first electric propulsion motor 1 is located at a downstream side of the engine 2 as shown in FIG. 4. In the example shown in FIG. 3, the output axle of the engine 2 is directly coupled with the input axle of the clutch 3 to form integrally a single axle, the output axle of the engine 2 being linked to the output axle of the first motor 1 via an endless belt or a gear. In addition, in the example of the arrangement shown in FIG. 4, the output axle of the engine 2 is penetrated through a rotor of the first motor 1 and is directly coupled to the input axle of the clutch 3, the input axle of the clutch 3 constituting the single axle.

On the other hand, the arrangement of the continuously variable transmission 5 with respect to the output end of the clutch 3 and the second motor 4 may be such that the second motor 4 is disposed at an upstream side of the transmission 5 as shown in FIG. 3 or disposed at a downstream side of the transmission 5 as shown in FIG. 4.

In the example of the arrangement shown in FIG. 3, the output axle of the clutch 3 is directly coupled to an input axle of the continuously variable transmission (CVT) 5 penetrating (coaxial to) the rotor of the motor 4. The output axle of the clutch 3 is directly coupled to the output axle of the second motor 4, penetrating through the input axle of the continuously variable transmission (CVT) 5, the output axle of the clutch 3 being constituted by the single axle. In either case, the second motor 4 is linked to the input axle of the continuously variable transmission 5.

The arrangement of the power train is not limited to those examples shown in FIGS. 3 and 4. Both of the engine 2 and the first electric propulsion motor 1 are linked to the input axle of the clutch 3. The output axle of the clutch 3 is linked to the input axle of the motor 4.

In addition, if a propulsion mechanism transmitting the power to the drive wheels 8 via the speed reduction device (gear) 6 and the differential device 7 from the output axle of the continuously variable transmission 5 is included in the power train, any arrangement of each electric device may be permitted.

Figure 5:
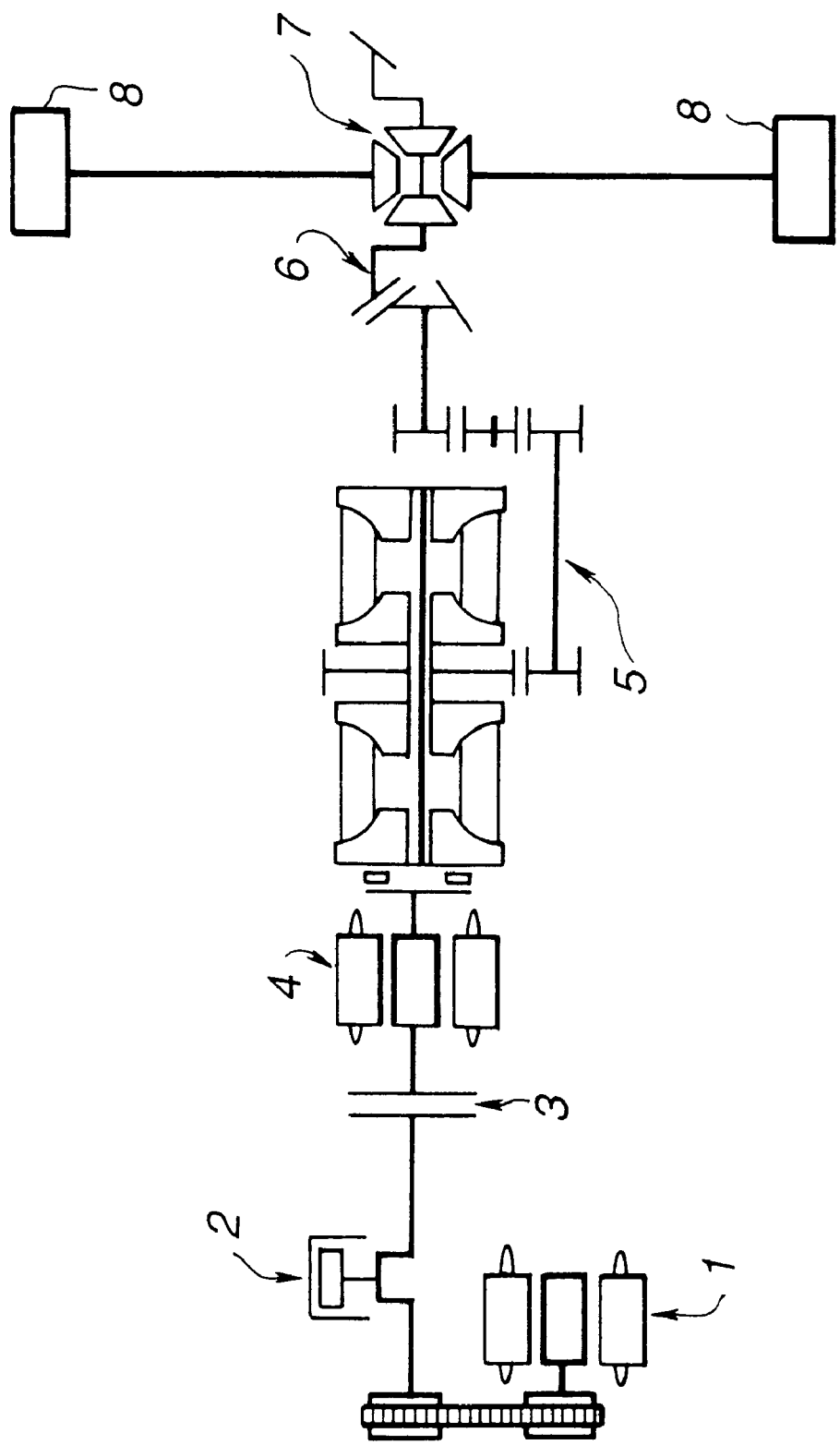
FIG. 5 is a still another exemplified explanatory view of a still another arrangement of the power train in the hybrid vehicle in the preferred embodiment shown in FIG. 1.

FIG. 5 shows an example of the arrangement of the power train using the toroidal CVT as the continuously variable transmission 5.

In the case where the toroidal CVT is used as the continuously variable transmission 5, either the motor 4 or the toroidal CVT 5 may, at first, be disposed on the output axle side of the clutch 3.

However, in either case, the second motor 4 is linked to the input axle of the continuously variable transmission 5.

Tables 1 through 4 are operation tables of the objects to be controlled with respect to operations and states of the vehicle.

FIGS. 6 through 24 show explanatory views for explaining operations of respective components of the power train with respect to the vehicular operations and states.

Referring to the operation tables and operation explanatory views of TABLE 1 through 4 and FIGS. 6 through 24, the operation of the hybrid vehicle in the preferred embodiment for each operation mode will be described below.

In Tables 1 through 4, a symbol "−" denotes any possible state which may be accepted. In an operation (manipulated) system, "key" in the operation system denotes a set state of either ON or OFF of the key switch 20.

In addition, a term of "lever" in the manipulated system denotes a position P, N, R, or D of the selector lever detected by means of the selector lever switch 21, a term of "Accel." denotes any one of states of a release or a full depth of the accelerator pedal detected by the accelerator sensor 22, a small (shallow) depression displacement on the accelerator pedal, or a large (deep) depression displacement of the accelerator pedal.

The term of "brake" denotes a release and depression depth of a brake pedal detected by the brake switch 23.

On the other hand, the term of vehicular velocity in a status system means the vehicular velocity V denoted by means of the vehicular velocity sensor 24.

This specification prescribes that in the case when the vehicular velocity V is below the predetermined value V1 (V<V1), this vehicular velocity is called a low vehicular velocity, in the case where the vehicular velocity V falls in a range from a first predetermined value V1 up to a second predetermined value V2 (>V) ($\therefore$ V1$\leq$V$\leq$V2), this vehicular velocity is called a middle vehicular velocity, and in a case where the second vehicular velocity V is higher than the second predetermined value (V2,$\therefore$ V>V2), the vehicular velocity V is called a high vehicular velocity.

The term of "battery and temp." means a temperature Tb of the main battery 15 detected by means of the battery temperature sensor 25. If the battery temperature falls within a predetermined temperature range (Tb1$\leq$Tb$\leq$Tb2), the battery temperature indicates "appropriate".

If the battery temperature falls outside of the predetermined temperature range (namely either Tb<Tb1 or Tb>Tb2), the battery temperature indicates inappropriate. The inappropriate temperature state of the battery is a state in which either a charging capacity or a discharge capacity is reduced. A continuation of a charge/discharge under the inappropriate temperature state gives an influence on performance and life of the battery 15. Hence, the charge/discharge under the inappropriate temperature condition should not be carried out.

The term of battery SOC is an SOC (State Of Charge) detected by means of the battery SOC detecting device 26. If the SOC falls within a predetermined range (SOC1$\leq$SOC$\leq$SOC2), the SOC indicates appropriate. If the SOC is below a first predetermined value SOC1 (SOC<SOC1), the SOC indicates excessively small. If the SOC is larger than a second predetermined value SOC2 (SOC>SOC2), the SOC indicates excessively large. The excessively small SOC means that the discharge capacity is reduced. The continuation of the charge under the excessively large SOC condition gives an influence on the performance and life of the battery.

The term of "engine revolution" indicates the revolution velocity Ne of the engine detected by the engine speed sensor 27. If the engine speed Ne is equal to or above a predetermined value of the speed (Ne$\geq$Ne1, Ne1$\approx$0), the engine 2 is "revolved (Rev.)". If the engine speed Ne is lower than the predetermined value of Ne1 (Ne<Ne1), the engine 2 is "stopped". It is noted that the revolution state of the engine 2 indicates a case wherein the fuel is supplied and the engine is revolved by itself and a case wherein the engine is revolved together with the power train in the interlocking relationship.

The same reference numerals as those shown in FIG. 1 correspond to the like devices designated in the operation explanatory views of FIGS. 6 through 24 and the detailed explanations of these devices are omitted herein.

In each operation explanatory view, each device and line denoted by a bold solid line represents a transmission path of the device in operation, the mechanical force, the electric power, signal, and hydraulic.

(1) Key switch OFF mode (TABLE 1; Operation Mode 1)

Figure 6:
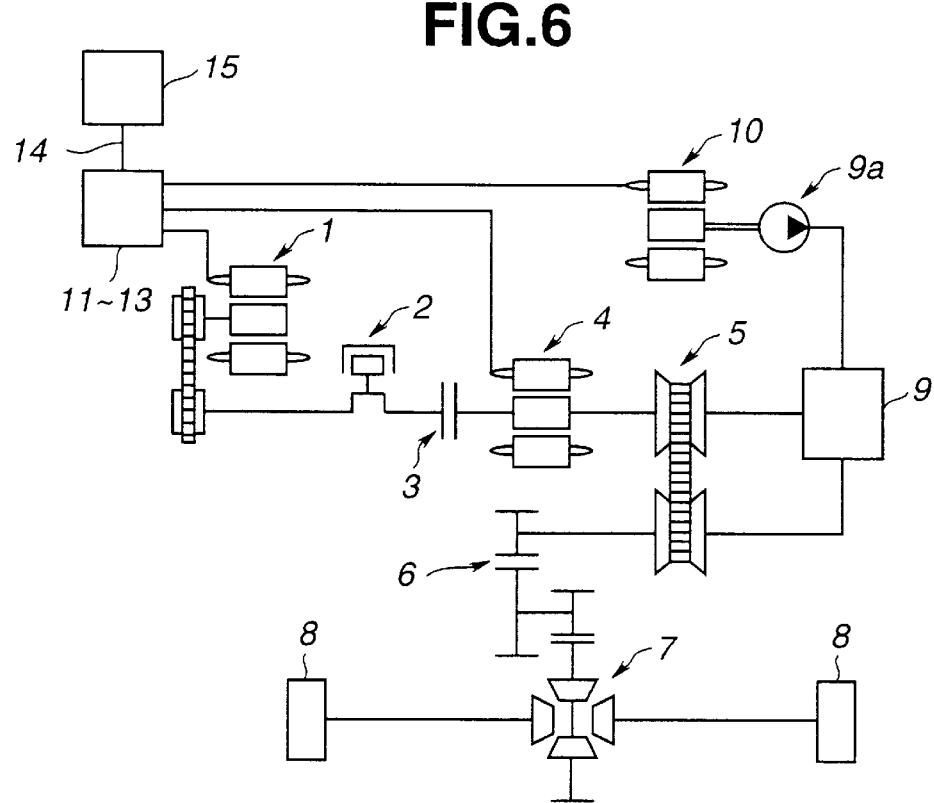
FIGS. 6 through 24 are explanatory views for explaining operations of the power train of the hybrid vehicle in the preferred embodiment shown in FIG. 1.

In Table 1, with the key switch 20 placed at the OFF position, the fuel supply to the engine 2 is stopped as shown in the operation explanatory view of FIG. 6, the first motor 1 is set in the no-power generation state, and the clutch 3 is released irrespective of any state or position of the selector lever, the accelerator pedal, or brake pedal. Furthermore, the second motor 4 is not operated, the gear (speed) ratio control over the continuously variable transmission 5 is stopped, and the third motor 10 is not operated. It is noted that the device denoted by a symbol 9a in FIG. 6 corresponds to an oil pump in the hydraulic system 9 shown in FIG. 1.

(2) Parking mode and Neutral mode (TABLE 1; Operation Mode 2)

Figure 7:
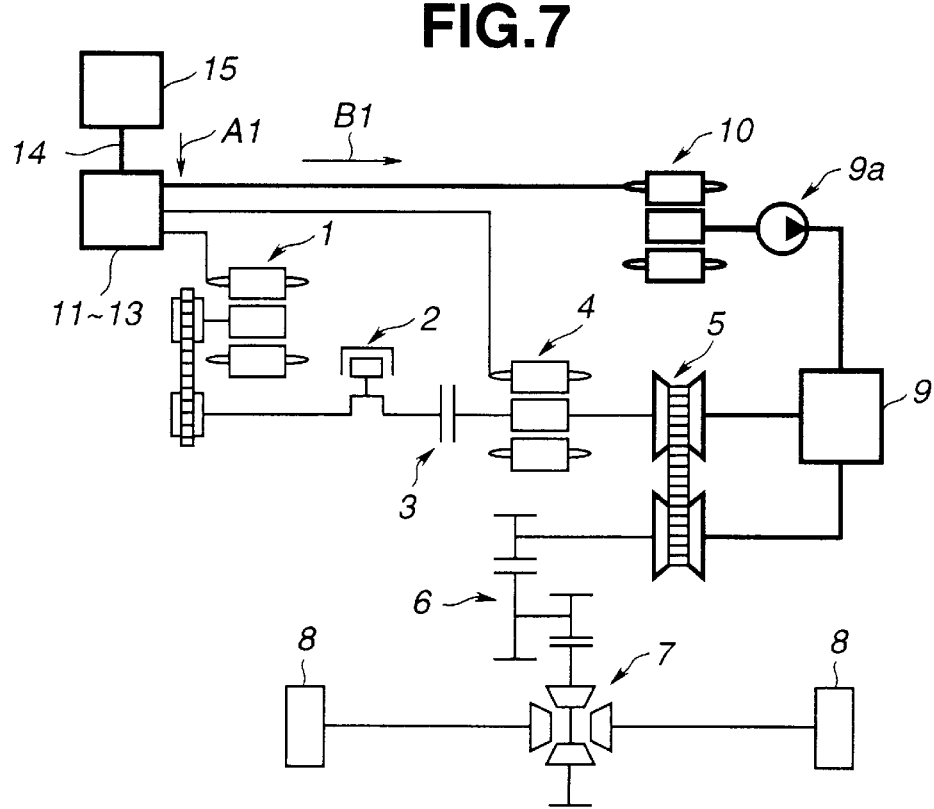

In TABLE 1, If the key switch 20 is placed at an ON position, the third electric propulsion motor 10 is driven as shown in FIG. 7, the hydraulic (working oil) is supplied from the hydraulic system 9 (specifically the oil pump 9a) to the continuously variable transmission 5 to perform the clamp and lubrication of the belt portion and to perform the gear (speed) ratio control of the continuously variable transmission 5 regardless of any possible position of the selector lever, the accelerator pedal, and the brake pedal.

Suppose a case wherein the vehicular occupant tries to make an abrupt start operation with the selector lever placed at a P or N position and the vehicle stopped. In this case, with the selector lever selected at either D or R position, the depression of the accelerator pedal is followed by the operation of the oil pump (third) motor 10. Waiting for a rise in the hydraulic (pressure in the working oil), a torque of either the second motor 4 or the engine 2 is caused to be developed. At this time, a response to the start operation becomes slow so that a driving maneuver (a vehicular drive feel) becomes worse.

The ON position of the key switch 20 means the case wherein the vehicular occupant has an intention to drive the vehicle. From this state, the operation of the oil pump motor 10 and the gear (speed) ratio control of the continuously variable transmission 5 are carried out so that a quick response to the abrupt start operation by the vehicular occupant can be achieved.

Suppose another case wherein the brake pedal is strongly depressed at a high speed with, for example, the selector lever placed at either P or N position. Even under a low frictional road surface, the tire wheels are often locked instantaneously in the other case described above. At this time, due to an inertia of each of the clutch 3 and the second electric propulsion motor 4 placed at the input end of the continuously variable transmission 5, the torque is applied to the belt portion of the continuously variable transmission 5. When the oil pump motor 10 is stopped, the belt slips, becomes lack in lubrication, and the belt is worn out. Hence, only if the key switch 20 is placed on the ON position, the operation of the oil pump motor 10 and the gear (speed) ratio control for the continuously variable transmission 5 are carried out so that a slip on the belt portion and a lack in lubrication can be prevented from occurring.

In a case where the SOC in the main battery 15 becomes excessively small when the selector lever is placed at P or N position with the key switch 20 placed at the ON position, the fuel is supplied to the engine 2 to drive the engine 2 and the first motor 1 generates the electric power as the power generator to supply the electric power to the oil pump motor 10 and to charge the main battery 15.

Figure 9:
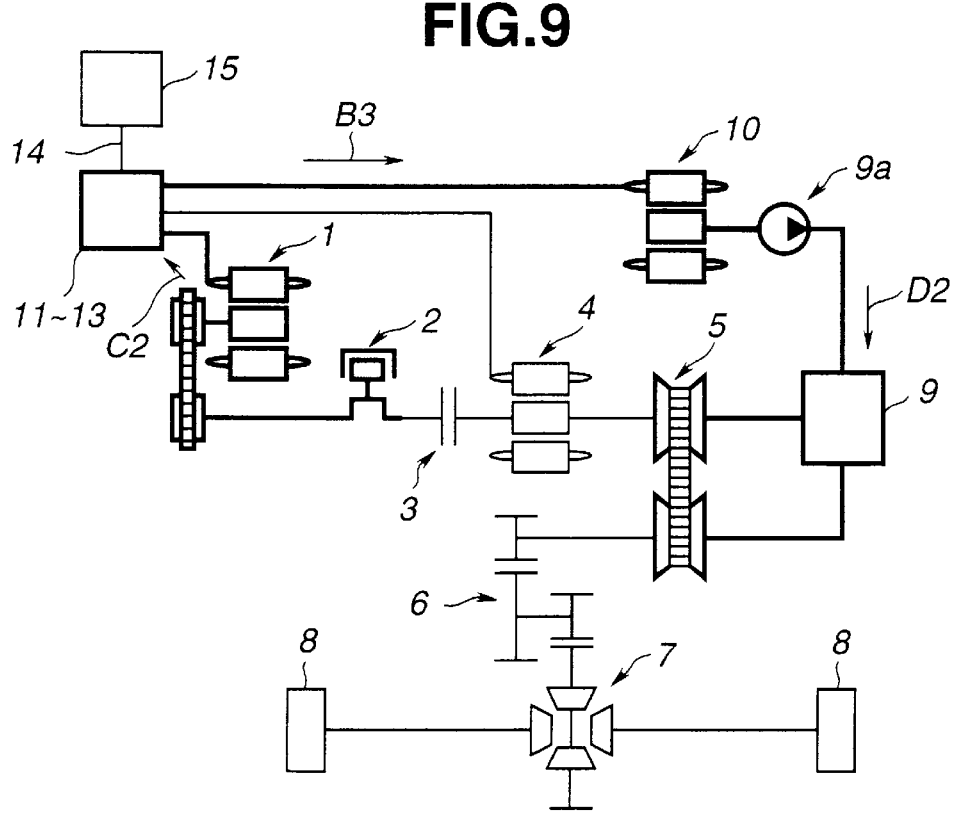

In a case where the temperature of the main battery 15 becomes inappropriate temperature condition when the selector lever is placed at either P or N position with the key switch 20 placed at the ON position, the fuel is supplied to the engine 2 to drive the engine 2, as shown in FIG. 9, and the first motor 1 generates the electric power to supply the electric power to the oil pump motor 10.

(3) Brake pedal depression mode when the selector lever is placed at R position (TABLE 2; Operation mode 3)

In a reverse mode, the clutch 3 is released and the motor 4 is reversed to backward the vehicle. Hence, even if a reverse mechanism is not provided on the continuously variable transmission 5, the engine 2 can be prevented from being revolved together with the second motor 4 in the interlocking operation during the reverse operation and the power consumption of the second motor 4 can be saved.

Figure 10:
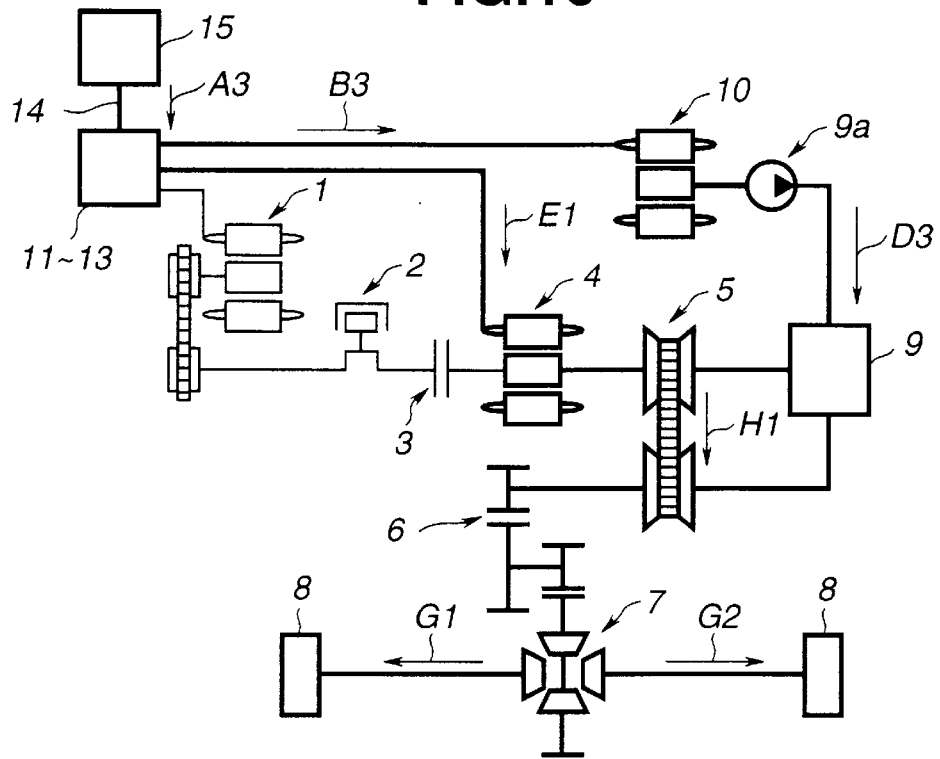

In a case where the brake pedal is depressed with the key switch 20 placed at the ON position and with the selector lever placed at the R position, the clutch 3 is released and the second motor 4 is operated to generate a creeping force as shown in FIG. 10. At this time, the braking force is detected and, as the braking force becomes large, the output torque of the motor 4 is reduced so that the creeping force may be reduced. Alternatively, the creeping force may be reduced in accordance with the increase in the vehicular velocity V. In FIG. 10, the battery 15 supplies the current A3 to the inverters 12 and 13 to supply the current B3 to the motor 10 and the current E1 to the motor 4.

Figure 11:
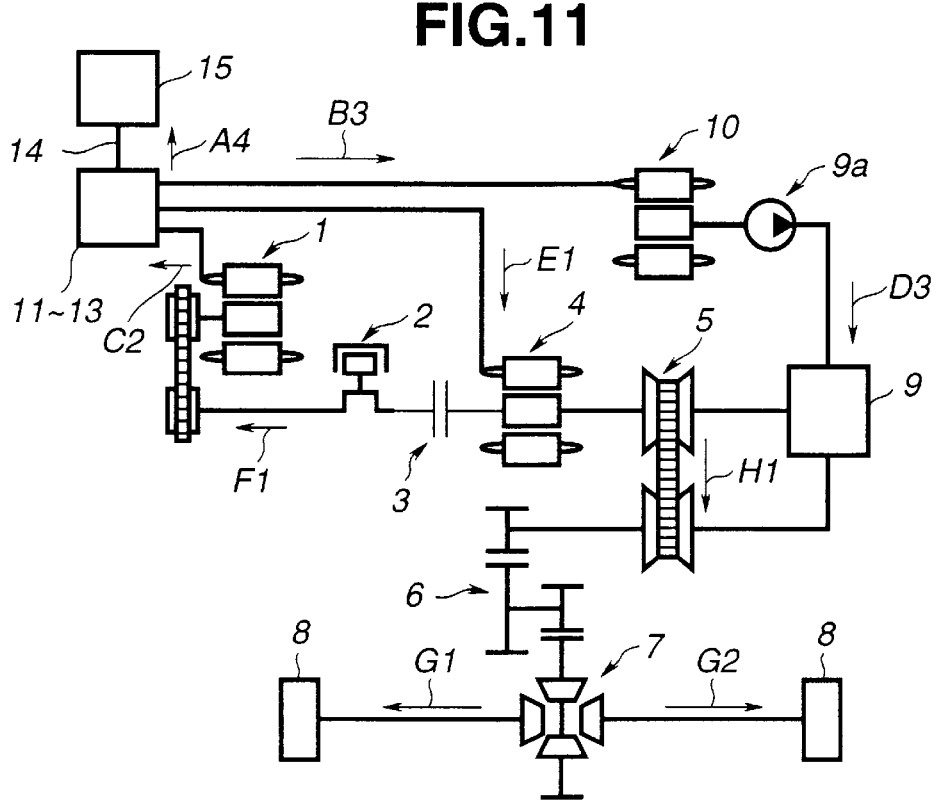

It is noted that in a case wherein the SOC of the main battery 15 becomes excessively small in this operation mode, the fuel is supplied to the engine 2 as shown in FIG. 11, to drive the engine 2 and the first motor 1 generates the electric power to supply the electric power to the second and third motors 4 and 10 and to charge the main battery 15.

In addition, in a case where the temperature of the main battery 15 in the operation mode becomes inappropriate, the fuel is supplied to the engine 2 to drive the engine 2, the first motor 1 generating the electric power to supply the electric power to the second and third motors 4 and 10. Consequently, even if the discharging capacity of the main battery 15 is reduced, the vehicle can be reversed.

(4) Accelerator pedal and brake pedal release mode when the reverse (R) mode is selected (TABLE 2; Operation mode 4)

In a case where both of the accelerator pedal and the brake pedal are released together when the key switch 20 is placed at the ON position with the selector lever placed at the R position, the clutch 3 is released, as shown in FIG. 10, and the second motor 4 is operated to generate the creeping force. At this time, as the vehicular velocity V becomes high, the output torque of the second motor 4 is reduced so that the creeping force may be reduced.

It is noted that in a case where the SOC of the main battery 15 becomes excessively small in this operation mode, the fuel is supplied to the engine 2 to drive the engine 2 and the first motor 1 generates the electric power to supply the electric power to the second and third electric propulsion motors 4 and 10 and to charge the main battery 15. In a case where the temperature of the main battery 15 in this operation mode indicates inappropriate, the fuel is supplied to the engine 2 to drive the engine 2 and to supply the electric power, as shown in FIG. 11, to the second and third electric propulsion motors 4 and 10. Consequently, even if the discharge capacity of the main battery 15 is reduced, the vehicle can be reversed (backward run).

(5) Accelerator pedal release mode when the reverse R is selected (Middle Vehicular Velocity)(TABLE 2; Operation mode 5)

Figure 13:
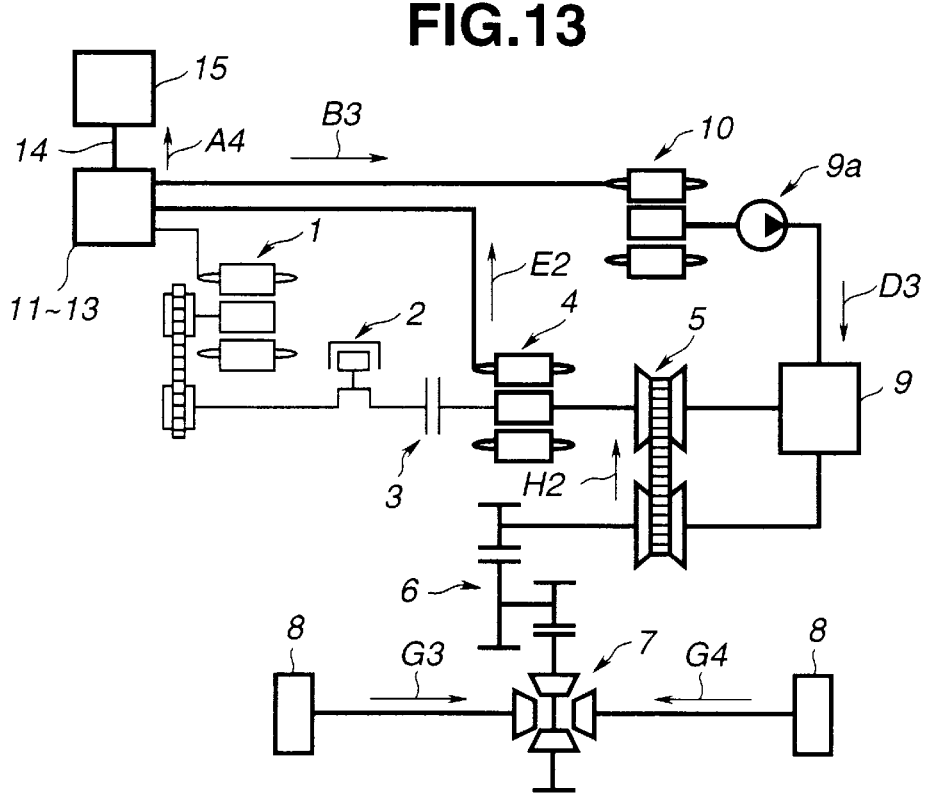

In a case where the vehicle is running at a middle vehicular velocity on a descending slope with the accelerator pedal released when the selector lever is placed at the R position with the key switch 20 placed at the ON position, a power regeneration by means of the second motor 4 is carried out so as to generate the regenerative braking force, as shown in FIG. 13, with the clutch 3 being released.

However, in a case where the SOC of the main battery 15 in this operation mode becomes excessively large, no charge capacity is present in the main battery 15 and, as shown in FIG. 7, the second motor 4 becomes inoperative (non-operation) and the regenerative brake drive is not carried out.

Figure 14:
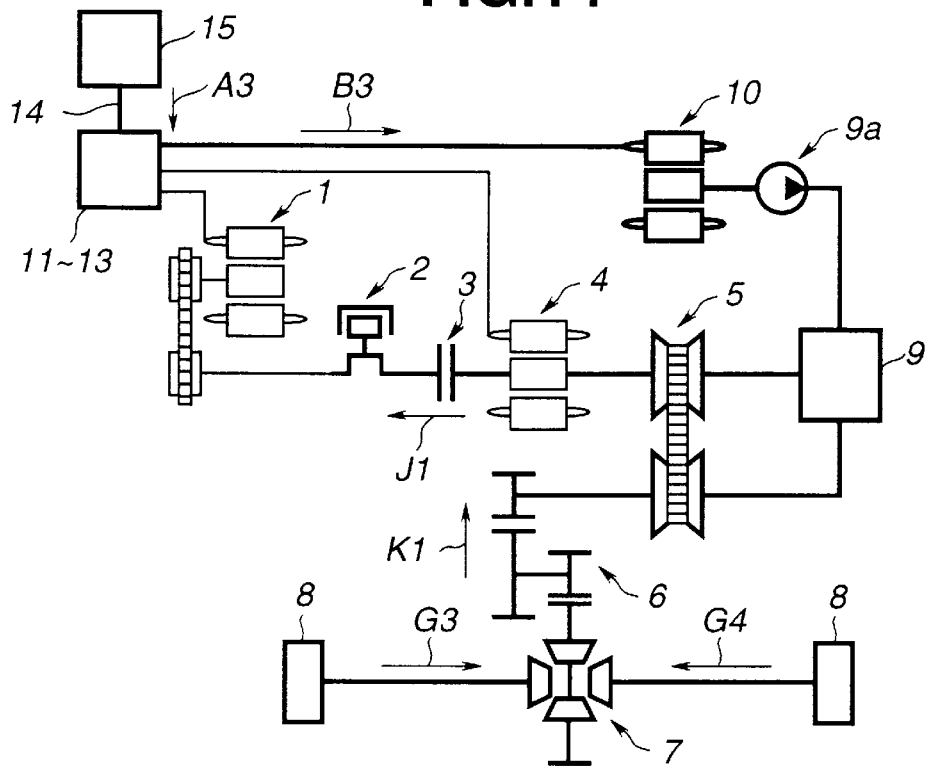

In addition, in a case where the SOC of the main battery 15 in this operation mode becomes excessively small, the fuel is supplied to the engine 2 to drive the engine 2, as shown in FIG. 14, the power generation by means of the first motor 1 is carried out, the power regenerative brake drive through the second motor 4 is carried out. At this time, the generated power and the regenerated power cause the charge of the battery 15 and the drive of the oil pump motor 10 to be carried out.

Thus, even if the brake pedal is quickly depressed to apply an abrupt brake so that the drive wheels 8 are locked, the regenerative power cannot be obtained, the generated power through the first motor 1 allows the drive of the oil pump motor 10 to be continued the supplied pressurized oil to be secured.

Figure 8:
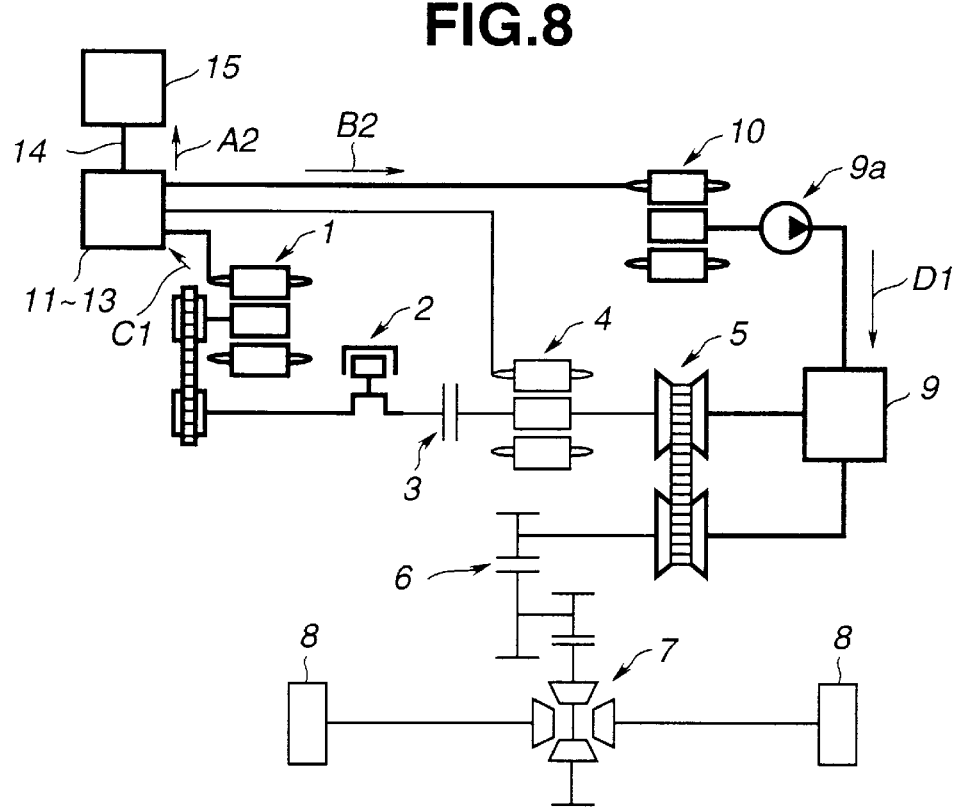

Furthermore, in a case wherein the main battery 15 becomes inappropriate in this operation mode, the fuel is supplied to the engine 2 to drive the engine 2, as shown in FIG. 8, and the power generation through the first motor 1 causes the power generation to be supplied to the third motor 10, the second motor 4 being not operated so that the regenerative brake drive is not carried out.

(6) Accelerator pedal depression mode when the reverse is selected (TABLE 2; Operation mode 6)

In a case wherein the accelerator pedal is depressed with the selector lever depressed, the selector lever placed at the R position, and the key switch 20 placed at the ON position, the clutch 3 is released, as shown in FIG. 10, a negative driving force is developed with the second motor 4 operated to reverse (backward) the vehicle. At this time, the output torque of the second motor 4 is adjusted in accordance with the depression depth (manipulated variable) θ of the accelerator pedal and the vehicular velocity V. Namely, as the manipulated variable θ of the accelerator pedal becomes large, the output torque of the second motor 4 is increased. As the vehicular velocity V becomes high, the output torque of the second motor 4 is reduced.

Figure 12:
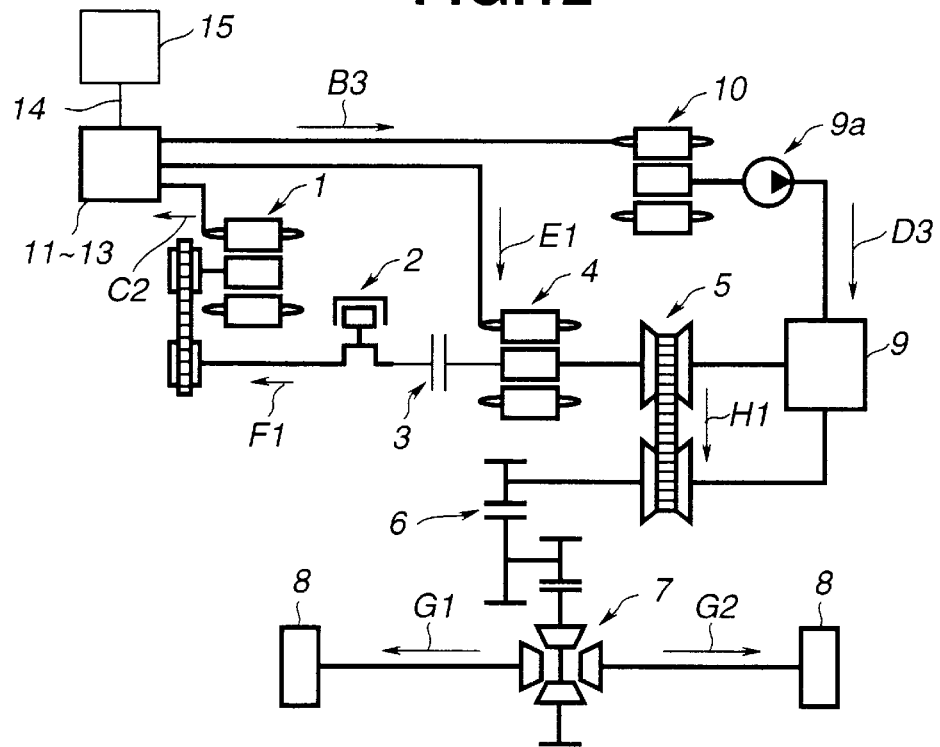

It is noted that in a case where the SOC of the main battery 15 becomes excessively small in this operation mode, the fuel is supplied to the engine 2 to drive the engine 2, as shown in FIG. 11, and the power generated by the first motor 1 is supplied to the second and third motors 4 and 10 and the main battery 15 is charged. In addition, in a case where the temperature of the main battery 15 becomes inappropriate in this operation mode, the fuel is supplied to the engine 2 to drive the engine 2, as shown in FIG. 12. The power generation by means of the first motor 1 is carried out so that the electric power generated thereby is supplied to the second and third motors 4 and 10.

(7) Brake pedal depression mode when the drive D is selected (TABLE 3; Operation mode 7)

In a case where the brake pedal is depressed and the vehicle is stopped or approximately stopped with the key switch 20 placed at the ON position and the selector lever placed at the D position, the second motor 4 is driven to rotate to generate the creeping force, as shown in FIG. 10.

At this time, the output torque of the second motor 4 is adjusted in accordance with the depression force of the brake pedal and the vehicular velocity V.

Namely, as the depression force on the brake pedal becomes large and as the vehicular velocity V becomes high, the output torque of the second motor 4 is reduced so that the creeping force is reduced.

In a case where the SOC of the main battery 15 becomes excessively small in this operation mode, the fuel is supplied to the engine 2 to drive the engine 2, as shown in FIG. 11, and the first motor 1 is used to generate the electric power to be supplied to the second and third motors 4 and 10. Then, the charge of the main battery 15 is carried out.

In addition, in a case wherein the temperature of the main battery 15 indicates inappropriate in this operation mode, the fuel is supplied to the engine to operate the engine 2, as shown in FIG. 12, and the motor 1 carries out the power generation so that the electric power is supplied to the oil pump motor 10.

(8) Both of accelerator pedal and brake pedal release modes when the selector lever is in the D range (lower vehicular velocity) (TABLE 3; Operation mode 8)

In a case where both of the accelerator pedal and the brake pedal are released and the vehicle is running at a relatively low velocity when the key switch 20 is placed at the ON position with the selector lever placed at the D position, the clutch 3 is released with the fuel supply to the engine 2 being stopped and the second motor 4 is driven to rotate to generate the creeping force. At this time, the output torque of the second motor 4 is regulated in accordance with the vehicular velocity V. That is to say, as the vehicular velocity V becomes increased, the output torque of the second motor 4 is reduced and the creeping force is decreased.

It is noted that in a case where the SOC of the main battery 15 becomes excessively small in this operation mode, the fuel is supplied to the engine 2 to drive the engine 2 and the first motor 1 is used to supply the electric power to the second and third motors 4 and 10 and the main battery 15 is charged.

In addition, in a case wherein the temperature of the main battery 15 in this operation mode becomes inappropriate, the fuel is supplied to the engine 2, as shown in FIG. 12, to drive the engine 2. The first motor 1 is used to generate the power and the power is supplied to the oil pump motor 10.

(9) Accelerator pedal release mode when the drive D is selected (Middle Vehicular Velocity)(TABLE 3; Operation mode 9)

In a case where the selector lever is placed at the D position with the key switch 20 placed at the ON position and the accelerator pedal is running at the middle vehicular velocity with the accelerator pedal released, the fuel supply to the engine 2 is halted and the clutch 3 is released, as shown in FIG. 13. In addition, the second motor 4 is driven to rotate the second motor 4 so as to generate the regenerative braking force. At this time, a regenerative torque for the second motor 4 in accordance with the vehicular velocity is regulated. That is to say, as the vehicular velocity V becomes high, the regenerative braking force is increased with the regenerative torque of the second motor 4 increased.

It is noted that in a case where the SOC of the main battery 15 indicates the excessively large in this operation mode, the second motor 4 is set to be not operated so as not to carry out the regenerative brake drive, as shown in FIG. 14, but the clutch 3 is engaged in place thereof and no fuel is supplied to the engine 2 to generate an engine braking force. It is of course that since the battery 15 is placed in the vicinity to a full charge, it is not necessary to generate the power by means of the first electric propulsion motor 1. Hence, even if the SOC becomes excessively large, the vehicular braking due to the engine braking can be achieved.

Figure 15:
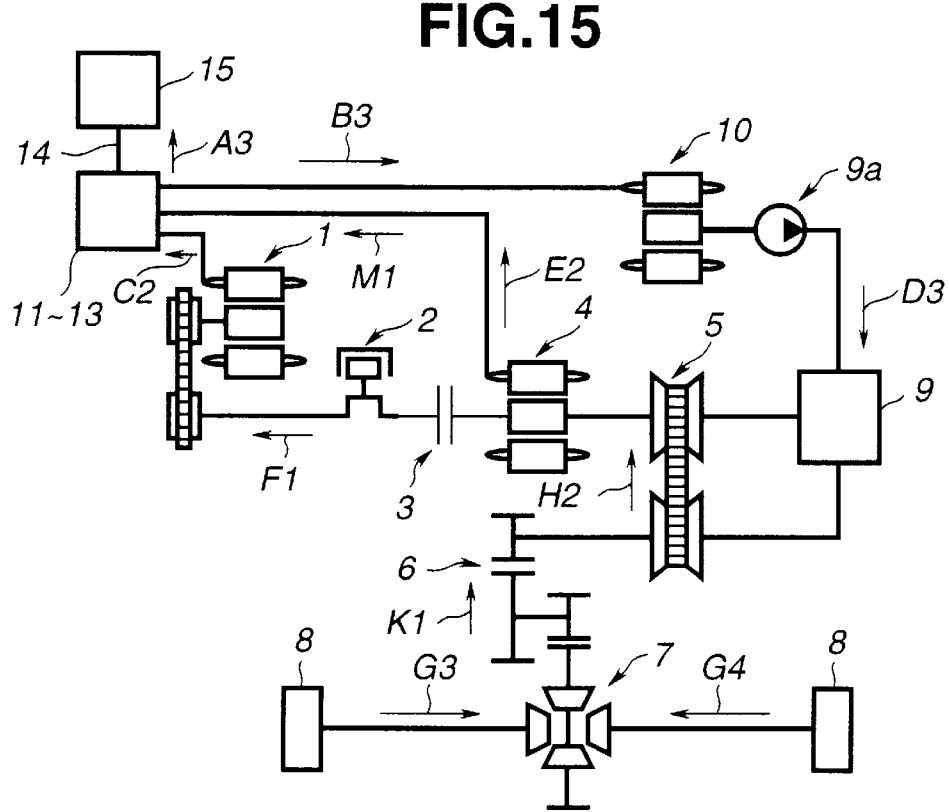

In addition, in a case where the SOC of the main battery 15 becomes excessively small in this operation mode, the second motor 4, as shown in FIG. 15, the second motor 4 is driven to operate the regenerative brake drive and, with the clutch 3 released, the fuel is supplied to the engine 2 to carry out the power generation through the first motor 1.

Then, both of the power generation through the first motor 1 and the power regeneration through the second motor 4 are supplied to the main battery 15 and the oil pump motor 10.

Figure 16:
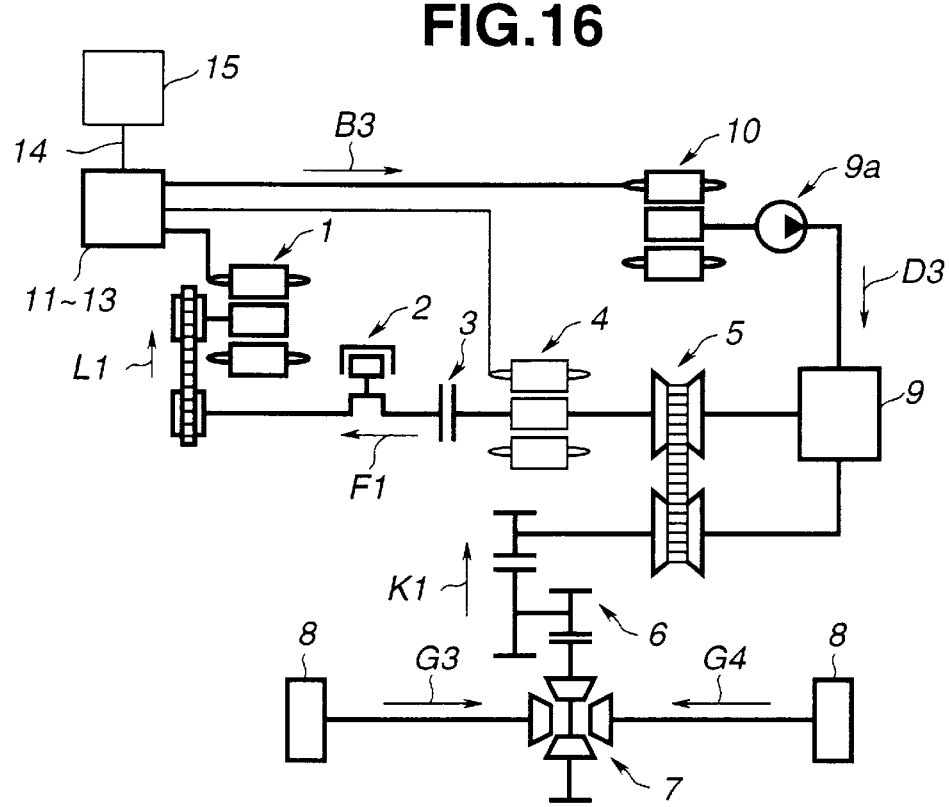

Furthermore, in a case where, in this operation mode, the temperature of the main battery 15 indicates inappropriate, the clutch 3, as shown in FIG. 16, is engaged in order to utilize the engine braking force without carrying out the regenerative braking force with the second motor 4 non-operation. Furthermore, the fuel is supplied to the engine 2 to drive the engine 2, the first motor 1 generating the power, and the power supplied to the oil pump motor 10 is carried out.

As described above, in a case where the selector lever is placed at the D position with the accelerator pedal released and the vehicle is running at the middle or high vehicular velocity, the second motor 4 carries out the regenerative brake drive.

When the SOC of the main battery 15 is in the appropriate state and its temperature is in the appropriate state, the discharge capacity of the main battery 15 is sufficiently high so that the regenerative power of the second motor 4 and the discharge power of the main battery 15 cause the oil pump motor 10 to be driven.

Hence, under this condition, the abrupt braking operation is carried out. Even if the drive wheels 8 are locked and the regenerative power by means of the second motor 4 becomes incapable, the power supply from the main battery 15 to the oil pump motor 10 is carried out. The drive of the oil pump motor 10 can be continued.

However, in a case where the SOC of the main battery 15 becomes excessively small or in a case where the temperature of the main battery 15 becomes inappropriate, the fuel is supplied to the engine 2 to drive the engine 2 and the first motor 1 is used to perform the power generation, the power supplied to the oil pump motor 10 to drive the motor 10 and the power supplied to the main battery 15 to charge the battery 15.

Hence, even if the power regeneration due to the abrupt braking operation becomes incapable, the power generation by means of the first motor 1 can continue the drive of the oil pump motor 10.

The slip of the belt of the continuously variable transmission 5 and the lack in lubrication can be prevented.

In addition, in a case where the accelerator pedal is released with the selector lever placed at the D position and the vehicle is running at the middle vehicular velocity, the clutch 3 is not engaged even if the SOC of the main battery 15 becomes excessively small. The regenerative power by means of the second motor 4 and the engine drive and power generation by means of the first motor 1 are carried out.

However, if the vehicle runs at the high revolution velocity under this condition, the regenerative power by means of the second motor 4 and the power generation by means of the first motor 1 are carried out.

This can avoid the power regeneration exceeding the charge capacity of the main battery, i.e., the charge capable power that the second motor has 4 at the vehicular run of the high velocity and, hence, the deterioration of the performance in the main battery 15 can be avoided.

(11) Accelerator pedal small depression mode when the drive D is selected (Small Accelerator Pedal depression variable θ) (TABLE 4: Operation mode 11)

In a case where the accelerator pedal is slightly depressed (within a predetermined depth, $\theta < \theta_1$) and the vehicle is stopped or running at the relatively low vehicular velocity when the key switch 20 is placed at an ON position with the selector lever placed at the D position when the key switch 20 is placed at the ON position, the clutch 3 is released and the second motor 4 is operated to generate the driving torque so that the vehicle is started, as shown in FIG. 11, or the vehicular velocity V is increased. At this time, the output torque of the second motor 4 is regulated in accordance with the depression depth θ of the accelerator pedal and the vehicular velocity V. That is to say, as the depression depth θ becomes large, the output torque of the motor 4 is increased and as the vehicular velocity V becomes high, the output torque of the motor 4 is reduced.

Figure 21:
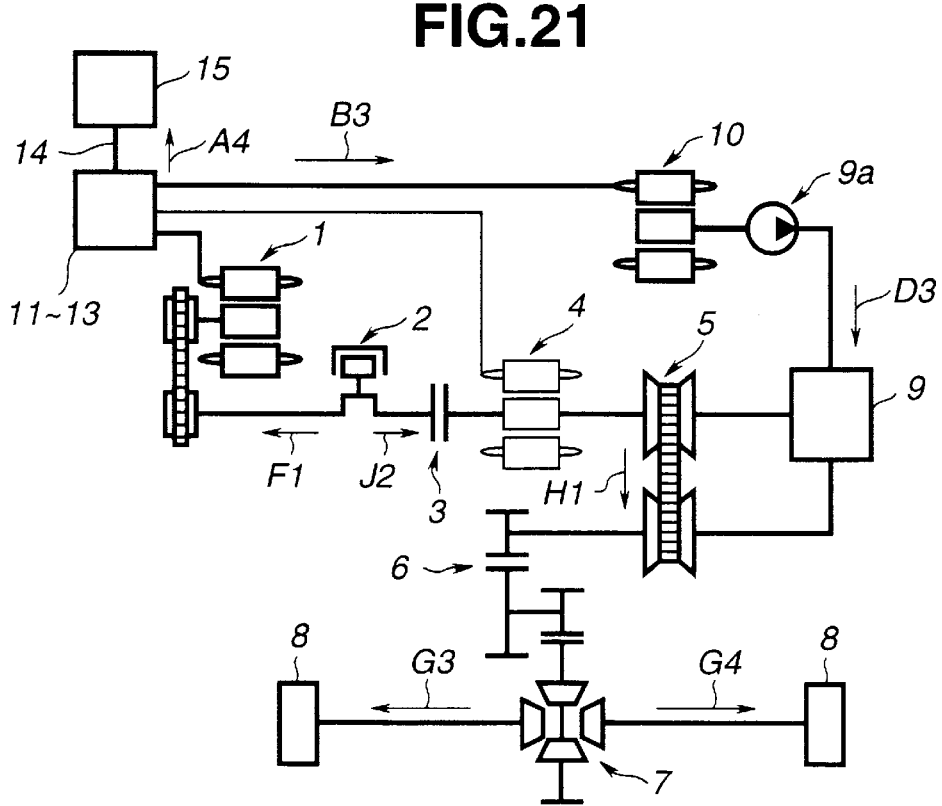

It is noted that in a case where the SOC of the main battery 15 becomes excessively small in this operation mode, the second motor 4 is not driven to rotate, as shown in FIG. 21, the fuel is supplied to the engine 2 to drive the engine 2, the clutch 3 is in a half engaged state to start the vehicle and to increase the vehicular velocity, and the first motor 1 generates the power, the electric power generated thereby being supplied to the main battery 15 and the oil pump motor 10.

It is also noted that in a case where a normally used powder type clutch is used as the clutch 3, the transmission torque through the powder type clutch 3 is proportional to an energizing current supplied to the clutch 3 so that the energizing current is controlled by the controller 16 to adjust the transmission torque to achieve the half clutched state. It is noted that the half clutched state corresponds to a semi-clutched state which is between a completely engagement state and a completely release state.

In this way, in the case where the accelerator pedal is depressed at the relatively low velocity and the discharge capacity of the main battery 15 is reduced, the fuel is supplied to the engine 2 to drive the engine 2 and the clutch 3 is set to be in the half clutched state.

Even if the second motor 4 cannot be driven due to the charge power of the main battery 15, hence, the vehicle can be started.

Figure 22:
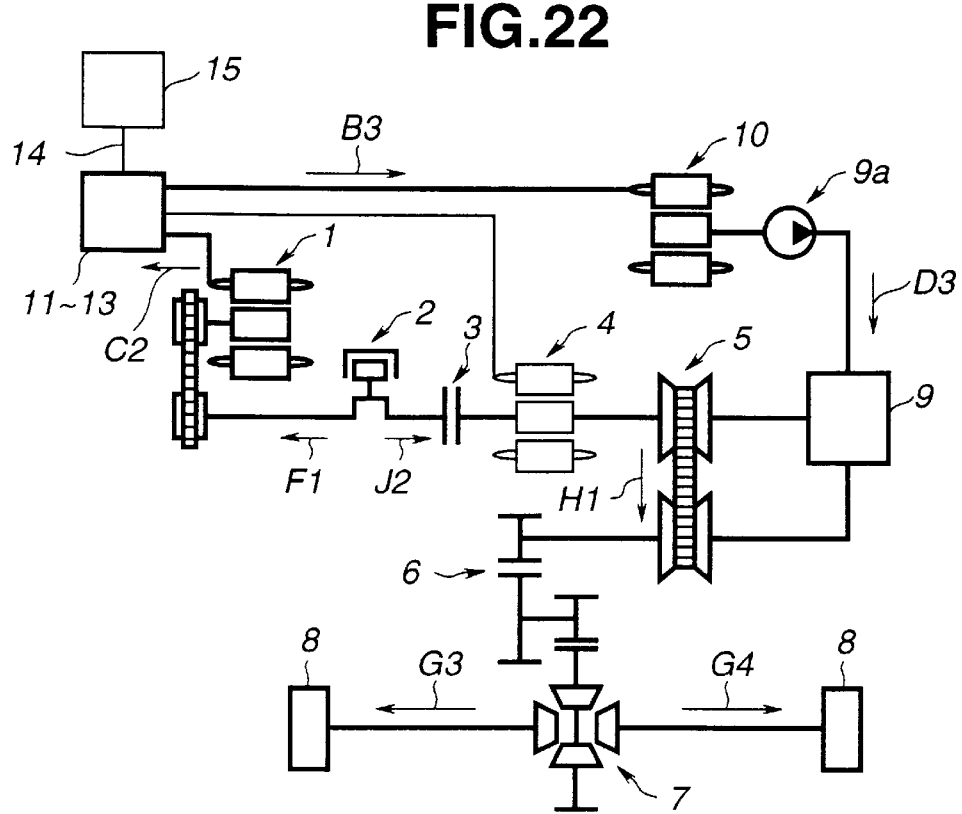

In addition, in a case where the main battery 15 becomes inappropriate temperature state in this operation mode, the second motor 4 is (in the non-operation state) in a non-driven state, as shown in FIG. 22, the fuel is supplied to the engine 2 to drive the engine 2, the clutch 3 is in the half clutched state to start the vehicle and increase the vehicular velocity V. Together with this, the first motor 1 generates the electric power so that the electric power is supplied to the oil pump motor 10.

In a case where the vehicular velocity V falls in the middle vehicular velocity in the small accelerator depression mode when the drive D is selected (operation mode 11), as shown in FIG. 10, the clutch 3 is released with the motor 4 operated to generate the drive force so that the vehicle is running through the driving force of the engine 2.

However, if the SOC of the main battery 15 becomes extremely small, as shown in FIG. 21, the motor 4 is in the non-operation mode, the fuel is supplied to the engine 2 to operate the engine, and the clutch 3 is engaged to run the vehicle through the drive force of the engine 2. Furthermore, the first motor 1 generates the power generation so that the generated power is supplied to the main battery 15 and to the oil pump motor 10.

In addition, in a case where the temperature of the main battery 15 indicates inappropriate, the second motor 4 is not driven, the clutch 3 is engaged so that the vehicle runs through the driving force of the engine 2 with the clutch 3 engaged and the electric power of the motor 1 is supplied to the oil pump motor 10, as shown in FIG. 22.

Figure 23:
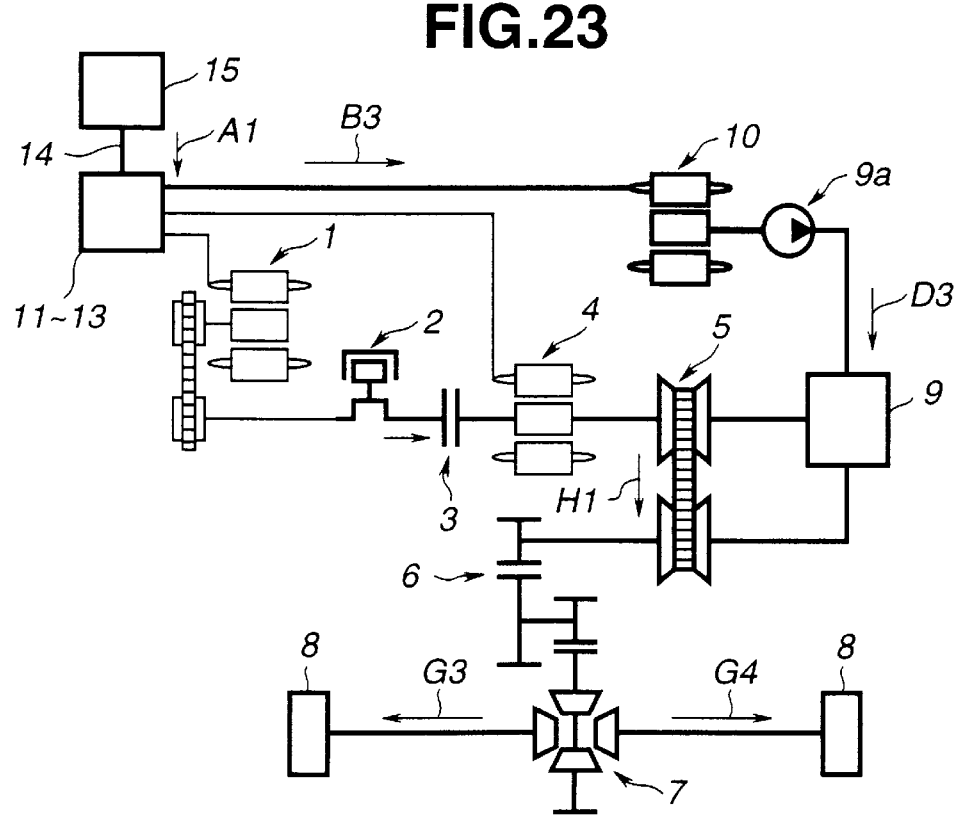

On the other hand, in a case where the vehicular velocity V is the relatively high vehicular velocity in the small depression mode of the accelerator pedal when the drive D is selected, the second motor 4 is not driven, as shown in FIG. 23, the clutch 3 is engaged, and the fuel is supplied to the engine 2 to drive the engine 2 so that the vehicle runs by means of the driving force of the engine 2.

At this time, the power generation by means of the first motor 1 is not carried out.

However, in a case where the main battery 15 indicates the excessively small state of the SOC, the power generation by means of the first motor 1 supplies the power to the main battery 15 and the oil pump motor 10, as shown in FIG. 21.

In addition, in a case where the temperature of the main battery 15 indicates inappropriate, the power generation by means of the first motor 1 is carried out to supply the electric power to the oil pump motor 10, the electric power generation by means of the first motor 1 being carried out as shown in FIG. 22.

(12) Large Depression Mode of the Accelerator Pedal When the drive D is selected (Large Accelerator Pedal Depression Depth θ) (TABLE 4; Operation mode 12)

Figure 24:
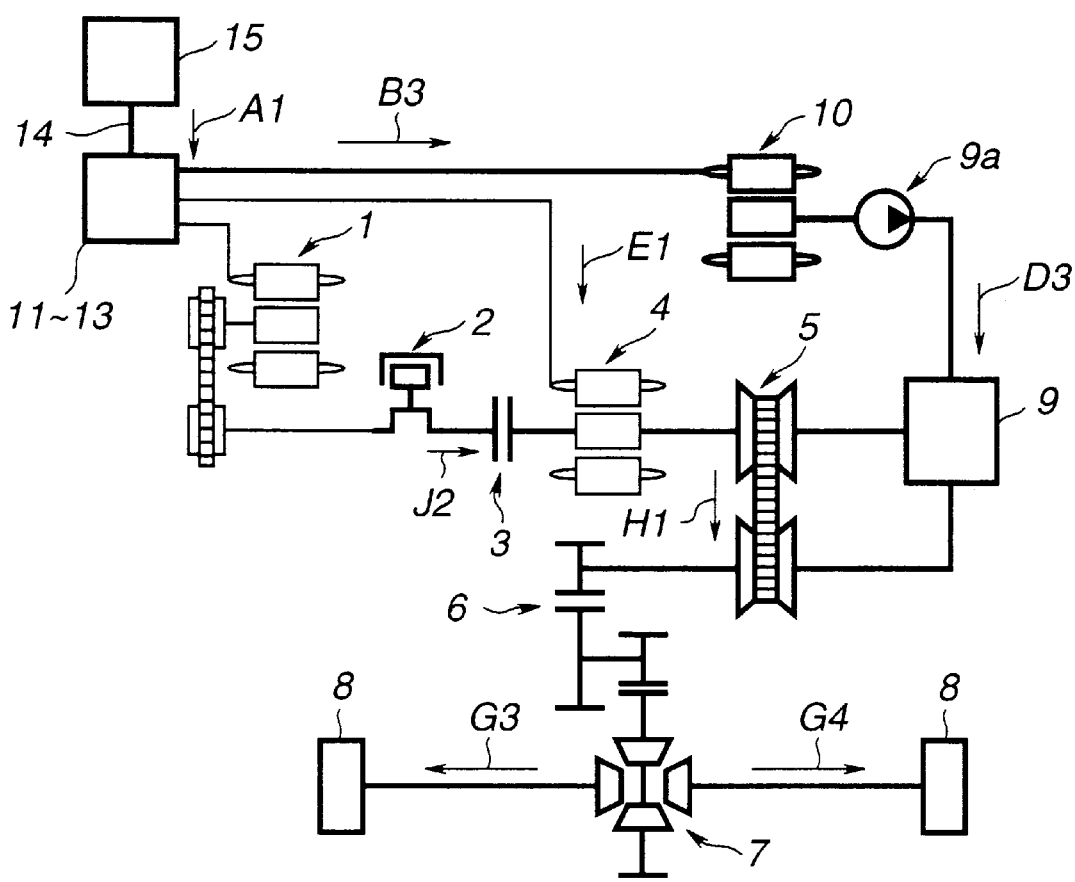

In a case where the accelerator pedal is depressed by a quantity equal to or larger than a predetermined quantity (θ≧θ1) when the selector lever is placed at the D position with the key switch 20 placed at the ON position and the vehicle is stopped or at the relatively low vehicular velocity, the fuel is supplied to the engine 2 to drive the engine 2, as shown in FIG. 24. Together with the clutch 3 in the half clutched state, the second motor 4 is driven to operate so that the vehicle is started and the velocity of the vehicle is increased through the drive force of the second motor 4.

At this time, the output torque of the second motor 4 is regulated in accordance with the depression depth θ of the accelerator pedal and the vehicular velocity V. Namely, as the depression depth θ becomes large, the output torque is increased. As the vehicular velocity V becomes high, the output torque is reduced.

As described above, since the clutch 3 is set in the half clutched state when the vehicle starts quickly with the accelerator pedal depressed deeply, the vehicle can be started even if the second motor 4 cannot be driven by means of the charged power of the main battery 15.

Especially, in a case where the vehicle has started abruptly with the accelerator pedal depressed deeply, the driving force developed by the engine 2 can be utilized with the clutch 3 being in the half engaged state so that the driving force developed by the second motor 4 can be suppressed and the power generation by the first motor 1 can accordingly be reduced. In other words, since the capacity of the first motor 1 can be reduced than that of the second motor 4, a small sizing of the power train of the hybrid vehicle can be achieved.

It is noted that if the SOC of the main battery 15 becomes excessively small in this operation mode, the second motor 4 is in the non-operation state, as shown in FIG. 21, the vehicle is started or the vehicular velocity is increased only by means of the driving force of the engine 2. Then, the first motor 1 performs the power generation to be supplied to the oil pump (third) motor 10.

In a case where the temperature of the main battery 15 becomes inappropriate in this operation mode, the second motor 4 is in the non-operation state, as shown in FIG. 22, and the vehicle is started and the vehicular velocity is increased only by means of the driving force of the engine. Then, the power generation by means of the first motor 1 is carried out to supply the electric power to the oil pump motor 10.

In a case where the vehicular velocity, then, indicates the middle or high velocity value in such a large (deep) depression mode with the accelerator pedal depressed deeply and the drive range selected, the fuel is supplied to the engine 2, as shown in FIG. 24, and the second motor 4 is driven to rotate.

With the clutch 3 engaged, the running of the hybrid vehicle is continued by means of the driving force of the engine 2 and the second motor 4.

The output torque of the second motor 4 is adjusted in accordance with the depression quantity (depth) θ of the accelerator pedal and the vehicular velocity V.

As the depression depth θ becomes large, the output torque of the second motor 4 becomes increased.

As the vehicular velocity V becomes high, the output torque of the second motor 4 is reduced.

However, in a case where the SOC of the main battery 15 becomes excessively small, the second motor 4 is in the non-operation state, as shown in FIG. 21, and the vehicle runs only by means of the driving force of the engine 2. Then, the power generation by means of the first motor 1 is carried out so that the power is supplied to the oil pump motor 10 and the main battery 15. In addition, in a case where the temperature of the main battery 15 indicates inappropriate, the second motor 4 is set to be non-operation state, as shown in FIG. 22, and the running of the hybrid vehicle is only caused by the driving force of the engine 2.

Then, the power generation by means of the first motor 1 is carried out and the generated power is supplied to the oil pump motor 10.

In the preferred embodiment described above, the main battery 15 constitutes a battery or cell, the inverters 11 through 13 constitute power inverters, the selector lever constitutes a manipulated member, the accelerator sensor 22 constitutes the accelerator pedal depression depth detecting means, the brake switch 23 constitutes the brake command detecting means, the vehicular velocity sensor 24 constitutes the vehicular velocity detecting means, and the battery temperature sensor 25 and the batter SOC detecting device constitutes charge/discharge capacity detecting means.

It is noted that the brake switch 23 may be replaced by a potentiometer which detects the depression depth of the brake pedal and outputs a signal to the controller 16, the level of the output signal being proportional to the depression depth of the brake pedal.

The toroidal type continuously variable transmission is exemplified by a U.S. Pat. No. 5,083,473 issued on Jan. 28, 1992, the disclosure of which is herein incorporated by reference.

The entire contents of Japanese Patent Applications P10-84149 (filed Mar. 30, 1998) are herein incorporated by reference.

Although the invention has been described above by reference to the certain embodiment of the present invention, the present invention is not limited to the embodiment described above will occur to those skilled in the art, in light of the above teachings.

The scope of the invention is defined with reference to the following claims.

TABLE 1

| OPERATION MODE | MANIPULATED SYSTEM | | | | STATUS SYSTEM | | | | DRAWING NOT TO BE REFERENCED |
|---|---|---|---|---|---|---|---|---|---|
| | KEY | LEVER | ACCEL. | BRAKE | VEHICULAR VELOCITY | BATTERY TEMP. | SOC | ENGINE REVOLUTION | |
| 1 | OFF | — | — | — | — | — | — | STOP | FIG. 6 |
| 2 | ON | P, N | — | — | — | APPRO. | APPRO./TOO LARGE | STOP | FIG. 7 |
| | | | | | | | TOO SMALL | REV. | FIG. 8 |
| | | | | | | IN-APPRO. | — | | FIG. 9 |

| OPERATION MODE | CONTROLLED OBJECTS | | | | | | DRAWING NOT TO BE REFERENCED |
|---|---|---|---|---|---|---|---|
| | ENGINE FUEL | MOTOR 1 POWER GENERATION | CLUTCH | MOTOR 4 | GEAR RATIO (SPEED) | MOTOR 10 | |
| 1 | STOP | NO POWER GENERATION | NON-ENGAGEMENT | NON-OPERATION | NO CONTROL | NON-OPERATION | FIG. 6 |
| 2 | STOP | NO POWER GENERATION | NON-ENGAGEMENT | NON-OPERATION | CONTROL | OPERATION | FIG. 7 |
| | SUPPLY | POWER GENERATION | | | | | FIG. 8 |
| | | | | | | | FIG. 9 |

TABLE 2

| OPERATION MODE | MANIPULATED SYSTEM | | | | STATUS SYSTEM | | | | DRAWING NO TO BE REFERENCED |
|---|---|---|---|---|---|---|---|---|---|
| | KEY | LEVER | ACCEL. | BRAKE | VEHICULAR VELOCITY | BATTERY TEMP. | SOC | ENGINE REVOLUTION | |
| 3 | ON | R | RELEASE | DEPRESSION | LOW VEHICULAR VELOCITY | APPRO. | APPRO./TOO LARGE | STOP | FIG. 10 |
| | | | | | | | TOO SMALL | REVOLUTION | FIG. 11 |
| | | | | | | IN-APPRO. | — | | FIG. 12 |
| 4 | | | RELEASE | RELEASE | LOW VEHICULAR VELOCITY | APPRO. | APPRO./TOO LARGE | STOP | FIG. 10 |
| | | | | | | | TOO SMALL | REV. | FIG. 11 |
| | | | | | | IN-APPRO. | — | | FIG. 12 |
| 5 | | | RELEASE | — | MIDDLE VEHICULAR VELOCITY | APPRO. | APPRO./TOO LARGE | STOP | FIG. 13, FIG. 7 |
| | | | | | | | TOO SMALL | REV. | FIG. 14 |
| | | | | | | IN-APPRO. | — | | FIG. 8 |
| 6 | | | DEPRESSION | RELEASE | LOW VEHICULAR VELOCITY | APPRO. | APPRO./TOO LARGE | STOP | FIG. 10 |
| | | | | | | | TOO SMALL | REV. | FIG. 11 |
| | | | | | | IN-APPRO. | — | | FIG. 12 |

| OPERATION MODE | CONTROLLED OBJECTS | | | | | | DRAWING NO TO BE REFERENCED |
|---|---|---|---|---|---|---|---|
| | ENGINE FUEL | MOTOR 1 POWER GENERATION | CLUTCH | MOTOR 4 | GEAR RATIO (SPEED) | MOTOR 10 | |
| 3 | STOP | NO POWER | NO | OPERATION | CONTROL | OPERATION | FIG. 10 |

TABLE 2-continued

| | | GENERATION | ENGAGEMENT | | |
|---|---|---|---|---|---|
| | SUPPLY | POWER GENERATION | | | FIG. 11 |
| | | | | | FIG. 12 |
| 4 | STOP | NO POWER GENERATION | NO ENGAGEMENT | OPERATION | FIG. 10 |
| | SUPPLY | ROWER GENERATION | | | FIG. 11 |
| | | | | | FIG. 12 |
| 5 | STOP | NO POWER GENERATION | NO ENGAGEMENT | REGENERATION NON-OPERATION | FIG. 13 FIG. 7 |
| | SUPPLY | POWER GENERATION | | REGENERATION | FIG. 14 |
| | | | | NON-OPERATION | FIG. 8 |
| 6 | STOP | NO POWER GENERATION | NO ENGAGEMENT | OPERATION | FIG. 10 |
| | SUPPLY | POWER GENERATION | | | FIG. 11 |
| | | | | | FIG. 12 |

TABLE 3

| | | | | | STATUS SYSTEM | | | DRAWING |
|---|---|---|---|---|---|---|---|---|
| OPERATION | | MANIPULATED SYSTEM | | | VEHICULAR | BATTERY | | ENGINE | NO TO BE |
| MODE | KEY | LEVER | ACCEL. | BRAKE | VELOCITY | TEMP. | SOC | REVOLUTION | REFERENCED |
| 7 | ON | D | RELEASE | DEPRESSION | LOW VEHICULAR VELOCITY (STOP) | APPRO. | APPRO./ TOO LARGE | STOP | FIG. 10 |
| | | | | | | | TOO SMALL | REVOLUTION | FIG. 11 |
| | | | | | | IN-APPRO. | — | | FIG. 12 |
| 8 | | | | RELEASE | LOW VEHICULAR VELOCITY | APPRO. | APPRO./ TOO LARGE | STOP | FIG. 10 |
| | | | | | | | TOO SMALL | REV. | FIG. 11 |
| | | | | | | IN-APPRO. | — | | FIG. 12 |
| 9 | | | | — | MIDDLE VEHICULAR VELOCITY | APPRO. | APPRO. TOO LARGE | STOP REV. | FIG. 13 FIG. 14 |
| | | | | | | | TOO SMALL | | FIG. 15 |
| | | | | | | IN-APPRO. | — | | FIG. 16 |
| 10 | | | | — | HIGH VEHICULAR VELOCITY | APPRO. | APPRO. TOO LARGE | REV. | FIG. 17 FIG. 18 |
| | | | | | | | TOO SMALL | | FIG. 19 |
| | | | | | | IN-APPRO. | — | | FIG. 20 |

| | | | CONTROLLED OBJECTS | | | | |
|---|---|---|---|---|---|---|---|
| OPERATION MODE | ENGINE FUEL | MOTOR 1 POWER GENERATION | CLUTCH | MOTOR 4 | GEAR RATIO (SPEED) | MOTOR 10 | DRAWING NO TO BE REFERENCED |
| 7 | STOP | NO POWER GENERATION | NON-ENGAGEMENT | OPERATION | CONTROL | OPERATION | FIG. 10 |
| | SUPPLY | POWER GENERATION | | | | | FIG. 11 |
| | | | | | | | FIG. 12 |
| 8 | STOP | NO POWER GENERATION | NON-ENGAGEMENT | OPERATION | | | FIG. 10 |
| | SUPPLY | POWER GENERATION | | | | | FIG. 11 |
| | | | | | | | FIG. 12 |
| 9 | STOP | NO POWER GENERATION | NON-ENGAGEMENT | REGENERATION | | | FIG. 13 |
| | | | ENGAGEMENT | NON-OPERATION | | | FIG. 14 |

TABLE 3-continued

Figure 17:
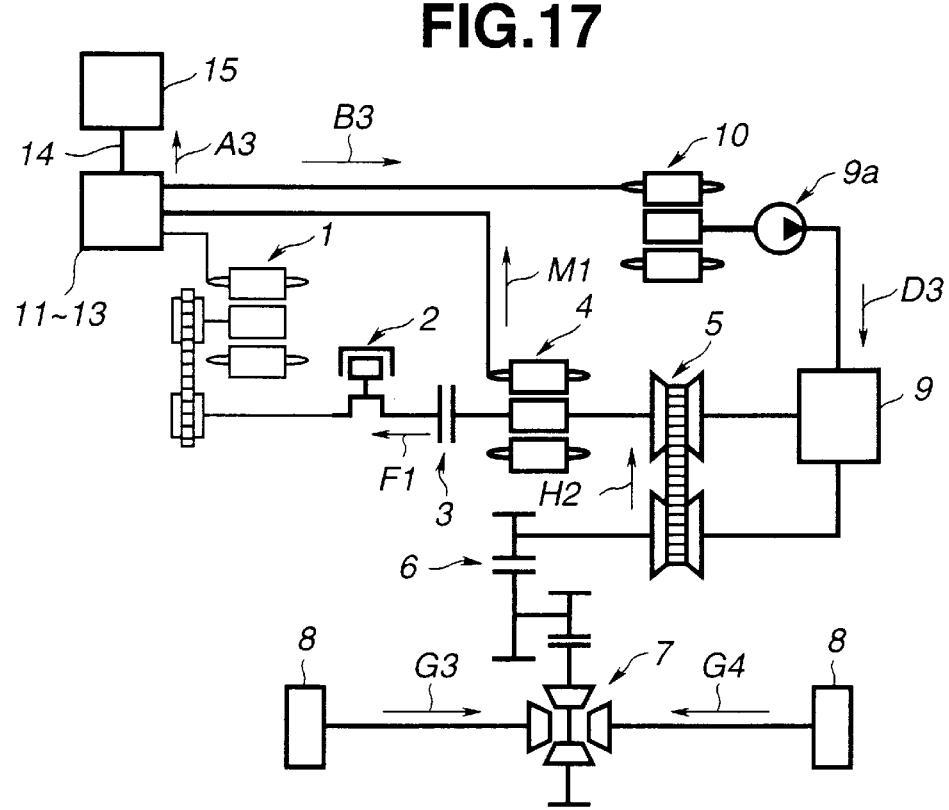
Figure 18:
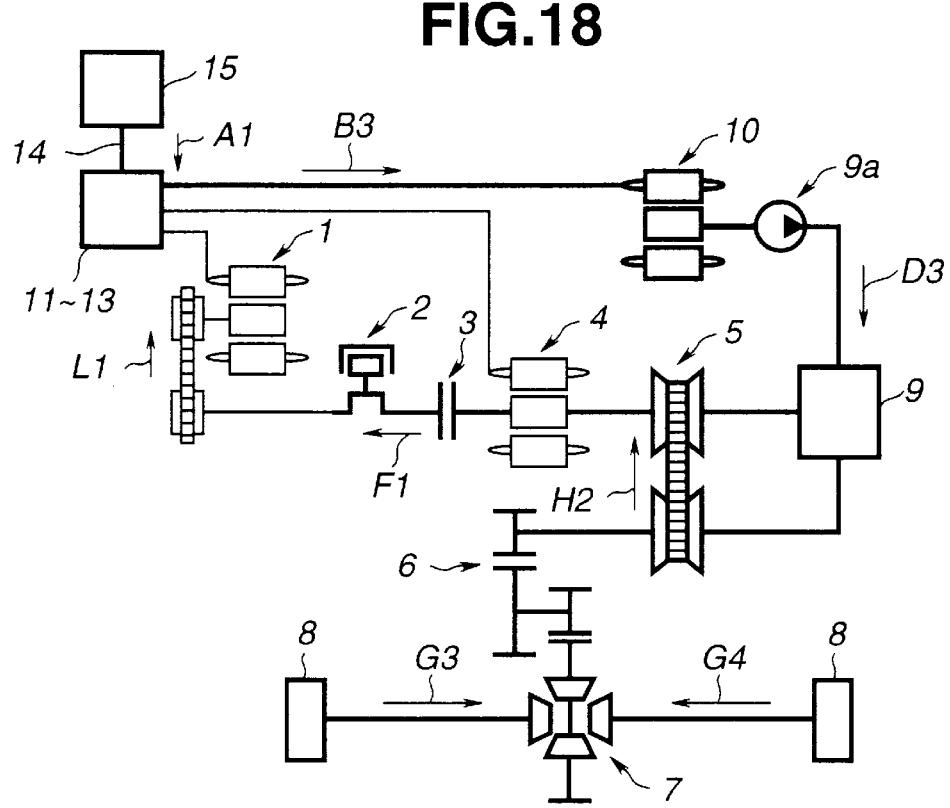
Figure 19:
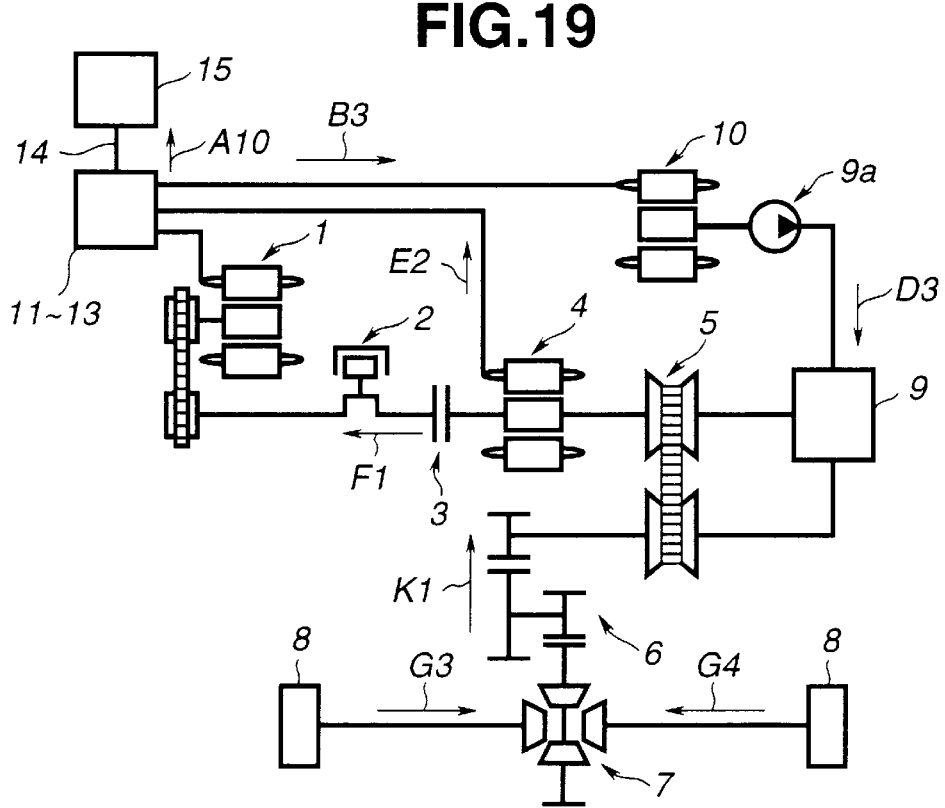
Figure 20:
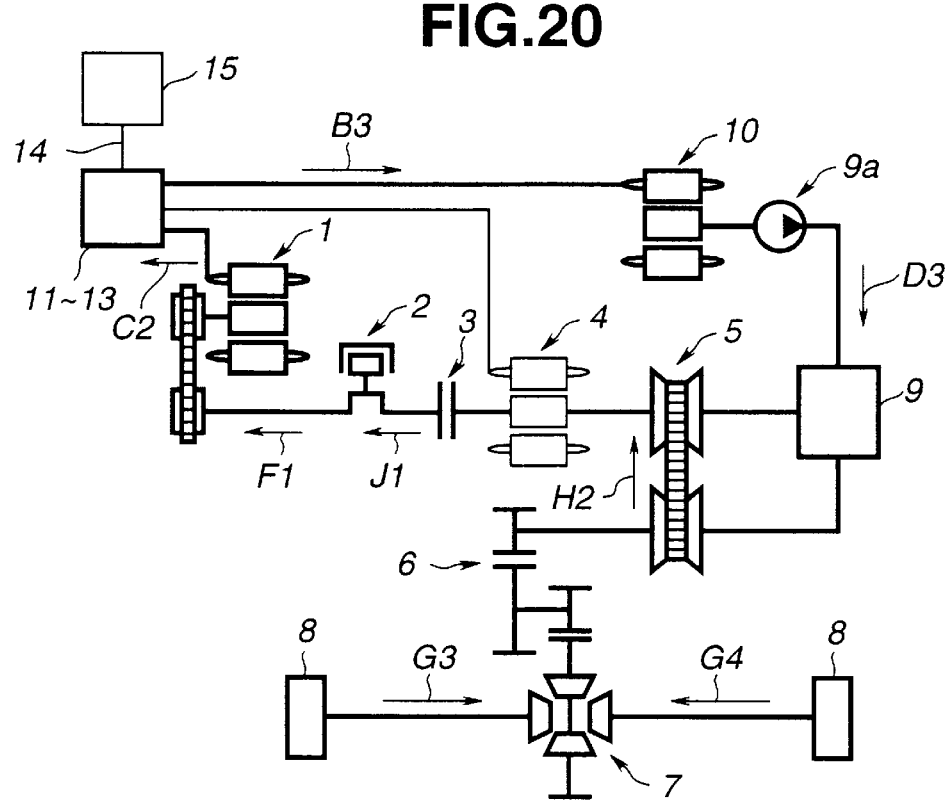

| | | SUPPLY | POWER GENERATION | NON-ENGAGEMENT | REGENERATION | | FIG. 15 |
|---|---|---|---|---|---|---|---|
| | | | | ENGAGEMENT | NON-OPERATION | | FIG. 16 |
| 10 | | STOP | NO POWER GENERATION | ENGAGEMENT | REGENERATION | | FIG. 17 |
| | | | | | NON-OPERATION | | FIG. 18 |
| | | SUPPLY | POWER GENERATION | | REGENERATION | | FIG. 19 |
| | | | | | NON-OPERATION | | FIG. 20 |

TABLE 4

| OPERATION MODE | MANIPULATED SYSTEM | | | | STATUS SYSTEM | | | | DRAWING NO TO BE REFERENCED |
|---|---|---|---|---|---|---|---|---|---|
| | KEY | LEVER | ACCEL. | BRAKE | VEHICULAR VELOCITY | BATTERY TEMP. | BATTERY SOC | ENGINE REVOLUTION | |
| 11 | ON | D | SMALL DEPRESSION | RELEASE | LOW VEHICULAR VELOCITY | — | APPRO./TOO LARGE | STOP | FIG. 10 |
| | | | | | | | TOO SMALL | REVOLUTION | FIG. 21 |
| | | | | | | | — | | FIG. 22 |
| | | | | | MIDDLE VEHICULAR VELOCITY | — | APPRO./TOO LARGE | STOP | FIG. 10 |
| | | | | | | | TOO SMALL | REVOLUTION | FIG. 21 |
| | | | | | | IN-APPRO. | — | | FIG. 22 |
| | | | | | HIGH VEHICULAR VELOCITY | APPRO. | APPRO./TOO LARGE | REV. | FIG. 23 |
| | | | | | | | TOO SMALL | REV. | FIG. 21 |
| | | | | | | IN-APPRO. | — | | FIG. 22 |
| 12 | | | LARGE DEPRESSION | RELEASE | LOW VEHICULAR VELOCITY | APPRO. | APPRO./TOO LARGE | REV. | FIG. 24 |
| | | | | | | | TOO SMALL | | FIG. 21 |
| | | | | | | IN-APPRO. | — | | FIG. 22 |
| | | | | | MIDDLE OR HIGH VEHICULAR VELOCITY | APPRO. | APPRO./TOO LARGE | REV. | FIG. 24 |
| | | | | | | | TOO SMALL | | FIG. 21 |
| | | | | | | IN-APPRO. | — | | FIG. 22 |

| | | | CONTROLLED OBJECTS | | | | | |
|---|---|---|---|---|---|---|---|---|
| OPERATION MODE | ENGINE FUEL | MOTOR 1 POWER GENERATION | CLUTCH | MOTOR 4 | | GEAR RATIO (SPEED) | MOTOR 10 | DRAWING NO TO BE REFERENCED |
| 11 | STOP | NO POWER GENERATION | NON-ENGAGEMENT | OPERATION | | CONTROL | OPERATION | FIG. 10 |
| | SUPPLY | POWER GENERATION | HALF ENGAGEMENT | NON-OPERATION | | | | FIG. 21 |
| | | | | | | | | FIG. 22 |
| | STOP | NO POWER GENERATION | NON-ENGAGEMENT | OPERATION | | | | FIG. 10 |
| | SUPPLY | POWER GENERATION | ENGAGEMENT | NON-OPERATION | | | | FIG. 21 |
| | | | | | | | | FIG. 22 |
| | SUPPLY | NO POWER GENERATION | ENGAGEMENT | NON-OPERATION | | | | FIG. 23 |
| | SUPPLY | POWER GENERATION | | | | | | FIG. 21 |
| | | | | | | | | FIG. 22 |
| 12 | SUPPLY | NO POWER GENERATION | HALF-ENGAGEMENT | OPERATION | | | | FIG. 24 |
| | | POWER GENERATION | | NON-OPERATION | | | | FIG. 21 |

TABLE 4-continued

| | | | | FIG. 22 |
|---|---|---|---|---|
| SUPPLY | NO POWER GENERATION | ENGAGEMENT | OPERATION | FIG. 24 |
| | POWER GENERATION | | NON-OPERATION | FIG. 21 |
| | | | | FIG. 22 |

What is claimed is:

1. A vehicle comprising:

a clutch having an input axle thereof and an output axle thereof;

an internal combustion engine for driving the input axle of the clutch;

a first electric propulsion motor for driving the input axle of the clutch;

a second electric propulsion motor for driving the output axle of the clutch;

a continuously variable transmission having an input axle connected to the output axle of the clutch via the second electric propulsion motor and an output axle connected to the drive wheels of the vehicle;

a third electric propulsion motor for driving a hydraulic system of the continuously variable transmission;

a battery supply;

a power inverter for charging and discharging between the battery supply and the first, second, and third electric propulsion motors; and a controller for controlling operations of the engine, the power inverter, the first, second, and third electric propulsion motors, and the continuously variable transmission.

2. A vehicle as claimed in claim 1, which further comprises: an operational member through which the vehicle is selected to start forward or backward; an accelerator detector for detecting a manipulated variable of an accelerator; a brake operation detector for detecting a manipulated variable of a brake unit; a vehicular velocity detector for detecting a vehicular velocity; a charge-discharge capacity detector for detecting either or both of charge and discharge capacities that the battery supply has; and wherein the controller includes a first determinator for determining an engagement or release of the clutch and either a supply of fuel to the engine or a stop of the supply of fuel to the engine on the basis of the manipulated variables of the accelerator and the brake unit, the vehicular velocity, and either or both of the charge and discharge capacities that the battery supply has when the vehicle is selected through the operational member to start forward.

3. A vehicle as claimed in claim 2, wherein the controller includes: a second determinator for determining whether the vehicular velocity is below a predetermined value of the vehicular velocity; a third determinator for determining whether the manipulated variable of the accelerator is zeroed; and a first command generator for generating a command to the second electric propulsion motor to drive the drive wheels with the clutch being commanded to be released when the vehicular velocity is below the predetermined value of the vehicular velocity and the manipulated variable of the accelerator is zeroed.

4. A vehicle as claimed in claim 2, wherein the controller includes: a second determinator for determining whether the vehicular velocity is below a predetermined value of the vehicular velocity; a third determinator for determining whether the discharge capacity of the battery supply is reduced; and a second command generator for generating a command to supply the fuel to the engine to drive the engine and to set the clutch in an approximately semi-clutched state when the vehicular velocity is below the predetermined value of the vehicular velocity and the discharge capacity of the battery supply is reduced.

5. A vehicle as claimed in claim 2, wherein the controller includes: a second determinator for determining whether the vehicular velocity is equal to or above a predetermined value of the vehicular velocity; a third determinator for determining whether the manipulated variable of the accelerator is zeroed; a fourth determinator for determining whether both or either of the charge and discharge capacities that the battery supply has are appropriate; and a first command generator for generating a command to stop the fuel supply to the engine and to perform a regenerative power by means of the second electric propulsion motor so as to apply a regenerative braking through the second electric propulsion motor, the regenerated power and/or the charge power of the battery supply driving the third electric propulsion motor, when the vehicular velocity is equal to or above the predetermined value of the vehicular velocity with the manipulated variable of the accelerator zeroed and both or either of the charge and discharge capacities that the battery supply has are appropriate.

6. A vehicle as claimed in claim 5, wherein the charge-and-discharge capacity detector includes a battery temperature sensor for detecting a temperature of the battery supply and an SOC detecting device for detecting a state of charge of the battery supply and wherein the fourth determinator determines that either or both of the charge and discharge capacities that the battery supply has are appropriate when the temperature (Tb) of the battery supply falls in a predetermined range (Tb1$\leq$Tb$\leq$Tb2).

7. A vehicle as claimed in claim 5, wherein the charge-and-discharge capacity detector includes a battery temperature sensor for detecting a temperature of the battery supply and an SOC detecting device for detecting a state of charge of the battery supply and wherein the fourth determinator determines that both of the charge and discharge capacities that the battery supply has are appropriate when the state of charge in the battery supply falls in a predetermined range (SOC1$\leq$SOC$\leq$SOC2).

8. A vehicle as claimed in claim 5, wherein the controller includes: a fifth determinator for determining whether the discharge capacity of the battery supply is reduced; and a third command generator for generating a command to supply the fuel to the engine to be driven and to carry out the power generation through the first electric propulsion motor and for generating a command to perform the power generation through the first electric propulsion motor and to drive the third electric propulsion motor through the generated power and/or the regenerated power by the second propulsion motor, when the discharge capacity of the battery supply is reduced.

9. A vehicle as claimed in claim 8, wherein the charge-discharge capacity detector includes a temperature sensor for detecting a temperature of the battery supply and wherein the fifth determinator determines whether the discharge capacity of the battery supply is reduced depending upon whether the temperature of the battery supply falls out of a predetermined range of temperature.

10. A vehicle as claimed in claim 8, wherein the charge-and-discharge capacity detector includes a charge quantity state detector for detecting whether a charge quantity of the battery supply is equal to or below a predetermined value of the charge quantity and wherein the fifth determinator determines whether the discharge capacity of the battery supply is reduced depending upon whether the charge quantity is equal to or below the predetermined value of the charge quantity.

11. A vehicle as claimed in claim 5, wherein the controller includes: a fifth determinator for determining whether a charge capacity that the battery supply has is reduced; a fourth command generator for generating a command to stop the power generation by the second electric propulsion motor and to stop the supply of fuel to the engine with the clutch engaged when the charge capacity of the battery supply is reduced.

12. A vehicle as claimed in claim 11, wherein the charge-discharge capacity detector includes a charge quantity state detector for detecting whether a charge quantity of the battery supply is in excess of a predetermined value of the charge quantity and wherein the fifth determinator determines whether the charge capacity of the battery supply is reduced depending upon whether the charge quantity of the battery supply is in excess of the predetermined value of the charge quantity.

13. A vehicle as claimed in claim 2, wherein the controller includes a sixth command generator for generating a command to release the clutch and to reverse the second electric propulsion motor to backward the vehicle when the backward of the vehicle is selected through the operational member.

14. A vehicle as claimed in claim 13, wherein the controller includes: a second determinator for determining whether the discharge capacity of the battery supply is reduced; and a second command generator for generating a command to supply the fuel to the engine, to generate the power generation through the first electric propulsion motor, and to drive the second and third electric propulsion motors through the generated power by the first electric propulsion motor when the discharge capacity of the battery supply is reduced.

15. A vehicle as claimed in claim 2, wherein the operational member includes a selector lever position switch for detecting a selector lever is selected at which position of P, N, R, or D, the accelerator detector detects a depression depth θ of an accelerator pedal, and the brake operation detector includes a brake switch for detecting whether a brake pedal is depressed.

16. A vehicle as claimed in claim 15, wherein the charge-and-discharge capacity detector includes a battery temperature sensor for detecting a temperature of the battery supply and an SOC detecting device for detecting a state of charge of the battery supply.

17. A vehicle as claimed in claim 15, which further comprises a key switch for activating the controller when it is at an ON position and wherein when the key switch is at an OFF position, the first propulsion motor is deactivated, the clutch is released, the second electric propulsion motor is deactivated, a speed ratio control of the continuously variable transmission is stopped, and the third electric propulsion motor is deactivated irrespective of any possible position of the selector lever, the depression depth or release of the accelerator pedal, and the depression or release of the brake pedal.

18. A vehicle as claimed in claim 17, wherein, when the key switch is placed at the ON position, the controller activates the third electric propulsion motor to supply working fluid of the hydraulic system of the continuously variable transmission irrespective of any possible position of the selector lever, the depression depth or release of the accelerator pedal, and the depression of the brake pedal.

19. A vehicle comprising:

clutch means having an input axle thereof and an output axle thereof;

an internal combustion engine for driving the input axle of the clutch means;

a first electric propulsion motor for driving the input axle of the clutch means;

a second electric propulsion motor for driving the output axle of the clutch means;

a continuously variable transmission having an input axle connected to the output axle of the clutch means via the second electric propulsion motor and an output axle connected to drive wheels of the vehicle;

a third electric propulsion motor for driving a hydraulic system of the continuously variable transmission;

a battery;

power inverting means for charging and discharging between the battery and the first, second, and third electric propulsion motors; and controlling means for controlling operations of the engine, the power inverting means, the first, second, and third electric propulsion motors, and the continuously variable transmission.

20. A method applicable to a vehicle comprising:

providing a clutch having an input axle thereof and an output axle thereof;

providing an internal combustion engine for driving the input axle of the clutch;

providing a first electric propulsion motor for driving the input axle of the clutch;

providing a second electric propulsion motor for driving the output axle of the clutch;

providing a continuously variable transmission having an input axle connected to the output axle of the clutch via the second electric propulsion motor and an output axle connected to drive wheels of the vehicle;

providing a third electric propulsion motor for driving a hydraulic system of the continuously variable transmission;

providing a battery supply;

providing a power inverter for charging and discharging between the battery supply and the first, second, and third electric propulsion motors; and controlling operations of the engine, the power inverter, the first, second, and third electric propulsion motors, and the continuously variable transmission.

* * * * *